(12) United States Patent
Gupta et al.

(10) Patent No.: US 11,798,431 B2
(45) Date of Patent: *Oct. 24, 2023

(54) PUBLIC SPEAKING TRAINER WITH 3-D SIMULATION AND REAL-TIME FEEDBACK

(71) Applicant: PITCHVANTAGE LLC, Tucson, AZ (US)

(72) Inventors: Anindya Gupta, Hoffman Estates, IL (US); Yegor Makhiboroda, Tucson, AZ (US); Brad H. Story, Tucson, AZ (US)

(73) Assignee: PITCHVANTAGE LLC, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,852

(22) Filed: Jun. 29, 2022

(65) Prior Publication Data

US 2022/0335854 A1    Oct. 20, 2022

Related U.S. Application Data

(63) Continuation of application No. 16/563,598, filed on Sep. 6, 2019, now Pat. No. 11,403,961, which is a
(Continued)

(51) Int. Cl.
*G09B 19/04* (2006.01)
*G06T 13/40* (2011.01)
(Continued)

(52) U.S. Cl.
CPC ............ *G09B 19/04* (2013.01); *G06T 13/205* (2013.01); *G06T 13/40* (2013.01); *G09B 5/06* (2013.01);
(Continued)

(58) Field of Classification Search
None
See application file for complete search history.

(56) References Cited

U.S. PATENT DOCUMENTS 6,029,158 A    2/2000   Bertrand
6,644,973 B2   11/2003  Oster
(Continued)

OTHER PUBLICATIONS

Chollet, "An Interactive Virtual Audience Platform for Public Speaking Training", Jan. 2017, https://www.youtube.com/watch?v=YiajdZJIZYQ.
(Continued)

*Primary Examiner* — Jason T Yen
(74) *Attorney, Agent, or Firm* — Brian M. Kaufman; Robert D. Atkins; PATENT LAW GROUP: Atkins and Associates, P.C.

(57) ABSTRACT

A public speaking trainer has a computer system including a display monitor. A microphone is coupled to the computer system. A video capture device is coupled to the computer system. A biometric device is coupled to the computer system. A simulated environment including a simulated audience member is rendered on the display monitor using the computer system. A presentation is recorded onto the computer system using the microphone and video capture device. A first feature of the presentation is extracted based on data from the microphone and video capture device while recording the presentation. A metric is calculated based on the first feature. The simulated audience member is animated in response to a change in the metric. A score is generated based on the metric. The score is displayed on the display monitor of the computer system after recording the presentation. A training video is suggested based on the score.

20 Claims, 11 Drawing Sheets

Related U.S. Application Data continuation of application No. 14/823,780, filed on Aug. 11, 2015, now Pat. No. 10,446,055.

(60) Provisional application No. 62/036,939, filed on Aug. 13, 2014.

(51) Int. Cl.

| | |
|---|---|
| *G09B 7/02* | (2006.01) |
| *G09B 5/06* | (2006.01) |
| *G09B 9/00* | (2006.01) |
| *H04N 5/76* | (2006.01) |
| *G06T 13/20* | (2011.01) |
| *G10L 15/02* | (2006.01) |
| *G10L 15/04* | (2013.01) |
| *G10L 25/03* | (2013.01) |
| *G10L 25/27* | (2013.01) |
| *G10L 15/187* | (2013.01) |

(52) U.S. Cl.
CPC ............. *G09B 7/02* (2013.01); *G09B 9/00* (2013.01); *G10L 15/02* (2013.01); *G10L 15/04* (2013.01); *G10L 15/187* (2013.01); *G10L 25/03* (2013.01); *G10L 25/27* (2013.01); *H04N 5/76* (2013.01)

(56) References Cited

U.S. PATENT DOCUMENTS

| | | | |
|---|---|---|---|
| 7,050,978 | B2 | 5/2006 | Silverstein et al. |
| 7,194,444 | B1 | 3/2007 | Nichols |
| 7,433,852 | B1 | 10/2008 | Bertrand et al. |
| 7,648,365 | B2 | 1/2010 | Olsen |
| 7,818,179 | B2 | 10/2010 | Krasikov et al. |
| 7,941,318 | B2 | 5/2011 | Lu |
| 8,457,967 | B2 | 6/2013 | Audhkhasi et al. |
| 8,756,057 | B2 | 6/2014 | Miller et al. |
| 8,987,573 | B1 | 3/2015 | Lippens et al. |
| 9,117,316 | B1 * | 8/2015 | Crutchfield, Jr. ........ A63F 13/58 |
| 9,257,122 | B1 | 2/2016 | Cancro et al. |
| 9,613,636 | B2 | 4/2017 | Gibbon et al. |
| 9,792,908 | B1 | 10/2017 | Bassemir et al. |
| 9,843,768 | B1 | 12/2017 | Negi et al. |
| 2003/0048893 | A1 | 3/2003 | McIllwaine et al. |
| 2003/0202007 | A1 | 10/2003 | Silverstein et al. |
| 2004/0030541 | A1 * | 2/2004 | Chou ........................ G09B 7/02 704/2 |
| 2004/0090424 | A1 | 5/2004 | Hurley et al. |
| 2004/0197750 | A1 | 10/2004 | Donaher et al. |
| 2005/0119894 | A1 | 6/2005 | Cutler et al. |
| 2006/0106611 | A1 | 5/2006 | Krasikov et al. |
| 2007/0238084 | A1 | 10/2007 | Maguire et al. |
| 2007/0244703 | A1 * | 10/2007 | Adams, Jr. .............. G09B 19/04 704/E15.047 |
| 2009/0038468 | A1 * | 2/2009 | Brennan .................. G09B 5/06 84/609 |
| 2009/0111670 | A1 | 4/2009 | Williams |
| 2009/0271195 | A1 | 10/2009 | Kitade et al. |
| 2010/0028846 | A1 | 2/2010 | Cohen et al. |
| 2010/0062403 | A1 * | 3/2010 | Williams ............... G09B 19/04 434/185 |
| 2010/0293061 | A1 | 11/2010 | Singer |
| 2011/0040554 | A1 | 2/2011 | Audhkhasi et al. |
| 2011/0213610 | A1 | 9/2011 | Chen et al. |
| 2011/0231194 | A1 | 9/2011 | Lewis et al. |
| 2011/0270612 | A1 | 11/2011 | Yoon et al. |
| 2012/0042274 | A1 | 2/2012 | Guyon et al. |
| 2012/0245942 | A1 | 9/2012 | Zechner et al. |
| 2012/0276512 | A1 | 11/2012 | Johnston et al. |
| 2014/0007147 | A1 | 1/2014 | Anderson |
| 2014/0010520 | A1 | 1/2014 | Bhatia et al. |
| 2014/0198174 | A1 | 7/2014 | Sanso |
| 2014/0272882 | A1 | 9/2014 | Kaufman et al. |
| 2014/0302469 | A1 | 10/2014 | Chen et al. |
| 2014/0356822 | A1 | 12/2014 | Hoque et al. |
| 2015/0004571 | A1 | 1/2015 | Ironside et al. |
| 2015/0112546 | A1 | 4/2015 | Ochsendorf et al. |
| 2015/0132735 | A1 | 5/2015 | Edge et al. |
| 2015/0269857 | A1 | 9/2015 | Feng |
| 2015/0283455 | A1 | 10/2015 | Nova |
| 2015/0339940 | A1 | 11/2015 | Aggarwal et al. |
| 2015/0362733 | A1 | 12/2015 | Spivack |
| 2016/0042648 | A1 | 2/2016 | Kothuri |
| 2016/0077547 | A1 | 3/2016 | Aimone et al. |
| 2016/0124909 | A1 | 5/2016 | Basson et al. |
| 2019/0139447 | A1 * | 5/2019 | Crawford ............ G10L 15/1807 |

OTHER PUBLICATIONS

Ciger, Jan et al., "Evaluation of Gaze Tracking Technology for Social Interaction in Virtual Environments," 2004, CiteSeerx5m, In Proc. of the 2nd Workshop on Modeling and Motion Capture Techniques for Virtual Environments (CPATECH'04), pp. 1-6.

Claudio, Ana; "Virtual Characters with Affective Facial Behavior"; 2014; https://ieeexplore.ieee.org/document/7296078?source=IQplus (Year: 2014).

Damian, Ionut; "Augmenting Social Interactions: Realtime Behavioural Feedback using Social Signal Processing Techniques"; Crossings Seoul Korea; Apr. 2015; https://dl.acm.org/citation.cfm?doid=2702123.2702314 (Year: 2015).

Hoque, Mohammed Ehsan, "Computers to Help with Conversations: Affective Framework to Enhance Human Nonverbal Skills", Massachusetts Institute of Technology, Sep. 2013, pp. 1-241.

Hoque, Mohammed Ehsan et al., "MACH: My Automated Conversation coacH, In the 15th International Conference on Ubiquitous Computing (Ubicomp)", Sep. 2013.

Kang et al.; "A Expressive Virtaul Audience with Flexible Behavioral Styles"; Dec. 2013; IEEE Transactions on Affective Computing; http://ieeexplore.ieee.org/stamp/stamp.jsp?arnumber=6714373&tag=1; https://www.researchgate.net/Publication/260288444_An_Expressive_Virtuai_Audience_with_Fiexible_Behaviorai_Styles.

Slater et al.; "Public Spearking in Virtual Reality: Facing an Audience of Avatars"; Projects in VR; May/Apr. 1999 IEEE;http://wwwO.cs.ucl.ac.uk!staff/M.Siater/Papers/g2prjvr.lo.pdf.

Stratou (1) et al.; "An Interactive Vritaul Audience Platform for Public Seaking Training", May 5, 2014; AAMAS 2014 p. 1657-1658; http://www.ifaamas.org/Proceedings/aamas2014/aamas/p1657.pdf.

Stratau (2) et al.; "Cicero-Towards a Multimodal Virtual Audience Platform for Public Speaking Training"; International Workshop on Intelligent Virtual Agents 2013: 116-128; http://www.schererstefan.net/assets/files/Batrinca_etAI.pdf.

Tudor et al.; "Virtual Audience Customization for Public Speaking Training Procedures"; Mar. 2013; https:/ /www. researchgate. net!publication/261 089878 Virtual_audience_customization for _public_speaking_training_procedures.

Weill Medical College of Cornell University; 2012; Virtual Audiences; https://web.archive.org/web/20120727210454/http://www.patss.com/hea_ser/vir_aud.html?name1=Virtual+Reality+Treatment&type1=2Select&name2=Virtuai+Audience&type2=3Active; and https://web.archive.org/web/20071 005023040/http://www.patss.com/heaser/movvir_aud.html.

Wortwein et al.; "Automatic Assessment and Analysis of Public Speaking Anxiety: A Virtual Audience Case Study"; 2015 Int. Conference on Affective Computing and Intelligent Interaction (ACII); http://ieeexplore.ieee.org/stamp/stamp.sp?arnu mber= 7344570.

* cited by examiner

Reports — 342

Company : ABC Company   Total Number of Users : 10
Average Score : 80.5   Total Practice Time : 12h 15m
— 344   — 346   — 348 — 350 — 352 — 354 — 356

| User | Location | Sessions | Total Time | Last Session | Score Average ▽△ | |
|---|---|---|---|---|---|---|
| J. Smith | St. Louis | 5 | 54m | 8/15 | 87 | View Details |
| M. Jones | Carlsbad | 4 | 1h 10m | 7/24 | 65 | View Details |
| B. Esin | Tempe | 3 | 1h 2m | 8/6 | 70 | View Details |
| J. Fres | Chicago | 5 | 48m | 8/16 | 90 | View Details |

*FIG. 15a*

PUBLIC SPEAKING TRAINER WITH 3-D SIMULATION AND REAL-TIME FEEDBACK

CLAIM OF DOMESTIC PRIORITY

The present application is a continuation of U.S. application Ser. No. 16/563,598, now U.S. Pat. No. 11,403,961, filed Sep. 6, 2019, which is a continuation of U.S. patent application Ser. No. 14/823,780, now U.S. Pat. No. 10,446,055, filed Aug. 11, 2015, which claims the benefit of U.S. Provisional Application No. 62/036,939, filed Aug. 13, 2014, which applications are incorporated herein by reference.

FIELD OF THE INVENTION

The present invention relates in general to learning game systems and, more particularly, to a three-dimensional (3-D) simulator with real-time analysis, feedback, and remediation for public speaking practice and improvement.

BACKGROUND OF THE INVENTION

Public speaking is a common activity in today's society. Beginning in grade school classrooms, where students are called upon to answer questions or must give reports in front of the class, through careers as lawyers, politicians, teachers, store managers, and many other occupations. At public and private meetings across the globe, people stand before crowds to deliver committee reports, financial reports, or technical presentations, answer questions, announce news, or otherwise report information to a crowd. FIG. 1 illustrates speaker 10 performing a presentation in front of audience members 12, 14, and 16. In FIG. 1, presenter 10 is speaking at a board meeting.

Public speaking is a challenging skill that almost everyone could improve upon, and very few feel totally comfortable performing. Some people fear public speaking to the point of physical distress, nausea, and feelings of panic. A number of methods have been proposed to overcome fear of public speaking, or to improve public speaking skills. Many attempt to rehearse public speaking. Practice can be performed in front of a mirror, or in front of a small group of friends and family. Those methods of practicing offer some benefit, but the feedback received by the presenter is minimal. A mirror offers almost nothing. Friends and family may applaud or give an encouraging comment, but are unlikely to offer serious constructive feedback.

A person can practice a speech while filming the presentation or recording the audio, and then review the recording to determine where improvements could be made. However, without a professional to review the performance, only major issues are likely to be noticed and improved upon. Reviewing a recording takes significant time when only a few specific points of the practice speech contain issues worth noting for improvement. In addition, feedback is not generally instantaneous, or even quick. A person may not review the tapes until a significantly later time. If the person wants a skilled second party to review the tapes, days or weeks could pass before feedback is received.

The challenges with prior art methods for public speaking practice mean that practice is time consuming and of limited value. The result is that a speaker may practice a speech once or twice prior to public speaking, but will not continue with practice to develop and perfect public speaking skills. Any benefit from practicing a speech once or twice is lost because the speaker does not continue the practice to reinforce public speaking skills.

In some work environments, where public speaking is a critical skill for employees, experts are hired to come into the company and train employees on public speaking. The experts are expensive and, once the training is complete, do not stick around to promote retention and reinforcement of skills. Moreover, speaking before an expert is a significantly different experience than speaking before a crowd. An ideal public speaking training solution would simulate the feeling of speaking before a crowd similar to the crowd that a student or employee would be speaking in front of in real life.

Current presentation and public speaking training solutions do not offer simulations and real-time feedback, limiting user engagement. Furthermore, current solutions lack sufficient mechanisms for practice, assessment, and reinforcement resulting in poor training continuity, sub-optimal retention, and loss of skills. Current training solutions produce poor returns on training investment.

BRIEF DESCRIPTION OF THE DRAWINGS

FIGS. 15a-15b illustrate a supervisor reviewing the performance of several employees.

DETAILED DESCRIPTION OF THE DRAWINGS

The present invention is described in one or more embodiments in the following description with reference to the figures, in which like numerals represent the same or similar elements. While the invention is described in terms of the best mode for achieving objectives of the invention, those skilled in the art will appreciate that the disclosure is intended to cover alternatives, modifications, and equivalents as may be included within the spirit and scope of the invention as defined by the appended claims and claims equivalents as supported by the following disclosure and drawings.

A presentation training system including a simulated presentation environment and real-time feedback is presented. A user 10 uses the presentation training system to practice presentations and develop public speaking skills. The training system simulates an environment similar to the environment that user 10 will actually be presenting in, and a crowd similar to the crowd that the user will be speaking to. The training system observes user 10 presenting via optical, audio, and biometric inputs, and is able to give real-time feedback during the presentation, summarize performance problems after the performance, and provide tips and tutorials for improvement. The training system provides a dynamic, goal based, educational experience.

Figure 1:
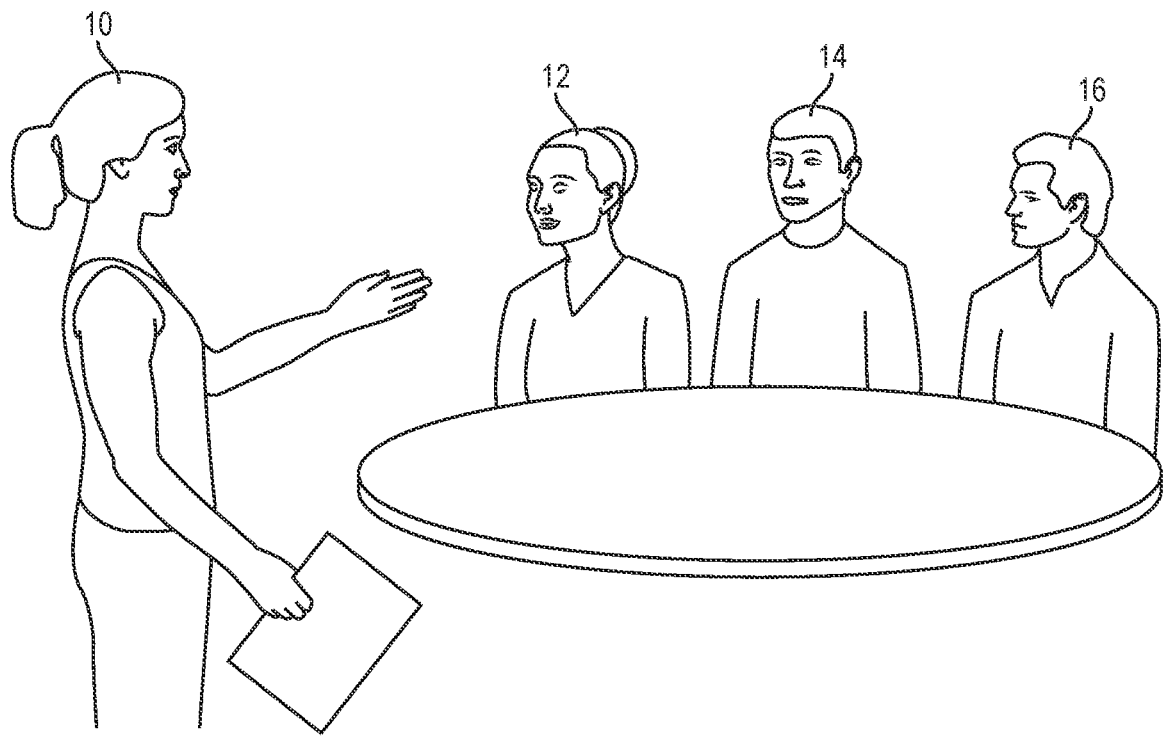
FIG. 1 illustrates a person presenting at a board meeting.
Figure 2:
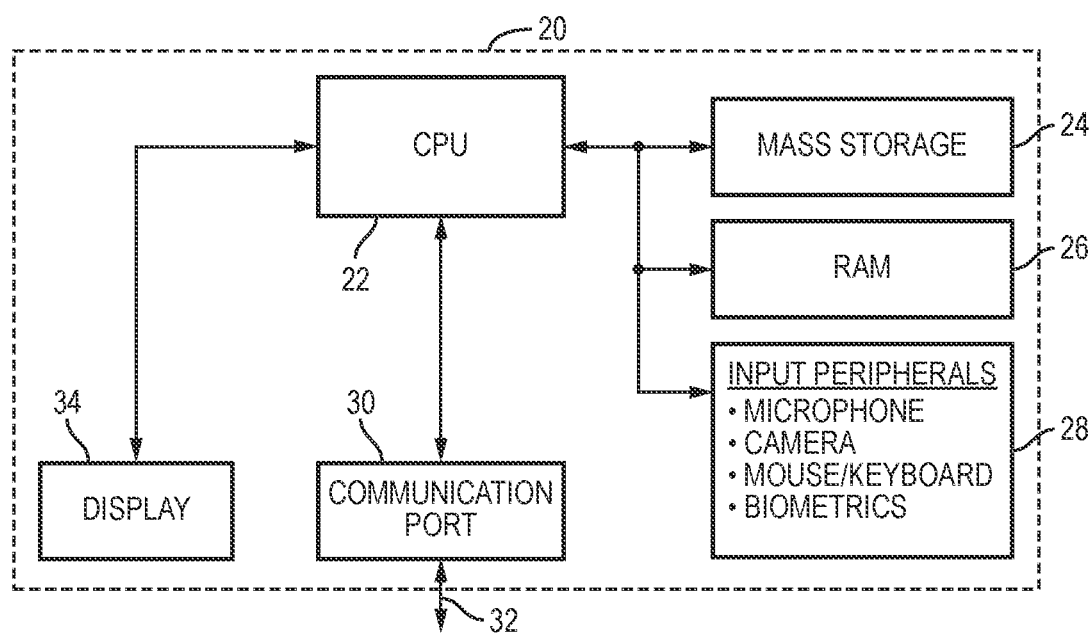
FIG. 2 illustrates a computer system to simulate environments and provide real-time feedback for a public speaking training system.

FIG. 2 illustrates a computer system 20 used to execute program code for the public speaking training and simulation software. Computer system 20 is a computer system located near user 10 while the user practices a presentation. Computer system 20 can be a desktop or laptop personal computer (PC), a video game console, a mobile phone or tablet, a virtual reality headset, or other electronic device able to execute software code to observe a presentation and present feedback to user 10. Computer system 20 includes a central processing unit (CPU) 22, mass storage or hard drive 24 coupled to be read from and written to by the CPU, random access memory (RAM) 26 coupled to be used by the CPU as temporary data storage, input peripherals 28 used to capture a performance of the user, communication port 30 used to communicate over a network using communication link 32, and a graphics display or monitor 34.

Program code for the training system is distributed via a portable mass storage medium, such as a compact disk (CD), digital versatile disk (DVD), or thumb drive. The program may also be downloaded over the internet or another network. Program code for the training system is initially stored in mass storage 24. The program code may be downloaded over the internet directly to mass storage 24, or the program code is installed from a CD or DVD onto mass storage 24. In some embodiments, the program code runs from the CD or DVD rather than being installed onto mass storage 24.

When user 10 wants to train with the presentation training system, the user uses an interface of computer system 20 to begin execution of the program code. CPU 22 is instructed by an operating system (OS) of computer system 20 to copy the program code from mass storage 24 into RAM 26. In embodiments where the program code is not installed onto mass storage 24, the program code is copied from a CD, DVD, or other portable storage media into RAM 26. CPU 22 then begins reading and executing the instructions embodied in the program code now stored in RAM 26. CPU 22 also uses RAM 26 to store temporary data such as recordings of the performance of user 10, features extracted from the presentation, and calculated ratings and statistics on the presentation. Such data may be stored permanently by copying the data to mass storage 24 or sending to a server via communication port 30.

CPU 22 receives streaming data representing the presentation of user 10 via input peripherals 28. Input peripherals 28 include a microphone, a camera, a keyboard and mouse, biometric inputs, and other peripherals capable of conveying information regarding a presentation of user 10. Data from input peripherals 28 streams to CPU 22, which handles the data as instructed by the program code of the training system. CPU 22 applies analysis algorithms to the data from input peripherals 28 to extract presentation features, calculate scores and ratings, and generate other feedback to benefit user 10. In some embodiments, CPU 22 sends select streaming data from input peripherals 28 to other computers, such as a local server or cloud server, for analysis via communication port 30. In other embodiments, CPU 22 sends the completed presentation by user 10 to a server via communication port 30 for remote storage, or data regarding the completed presentation for review by a supervisor.

Communication port 30 represents any hardware device of computer system 20 capable of communicating with other computer systems. In one embodiment, communication port 30 is a wired or wireless Ethernet adapter. Communication link 32 represents a network cable or a wireless link to another computer system or to a local network router.

Display 34 shows a graphical user interface with contents controlled by CPU 22 executing the program code of the training software. While user 10 is giving a presentation to the training system, display 34 shows a simulated environment including a realistic room with a crowd of people. The crowd reacts realistically, using gestures, movement, posture, and facial expressions, based upon the content of the presentation and how well the speech is delivered by user 10. Feedback to help user 10 develop presentation skills is presented visually on display 34 during the speech, and a summary including final performance ratings and tips is shown on the display after a presentation is complete. Display 34 may show user 10 giving the speech as a thumbnail while the user is presenting, and also shows the video of the speech after the presentation is complete for review by the user.

Display 34 is integrated into computer system 20 in some embodiments, such as when computer system 20 is a cell phone, tablet, or virtual reality headset. In other embodiments, display 34 is an external monitor connected to computer system 20 via a video cable.

Figure 3:
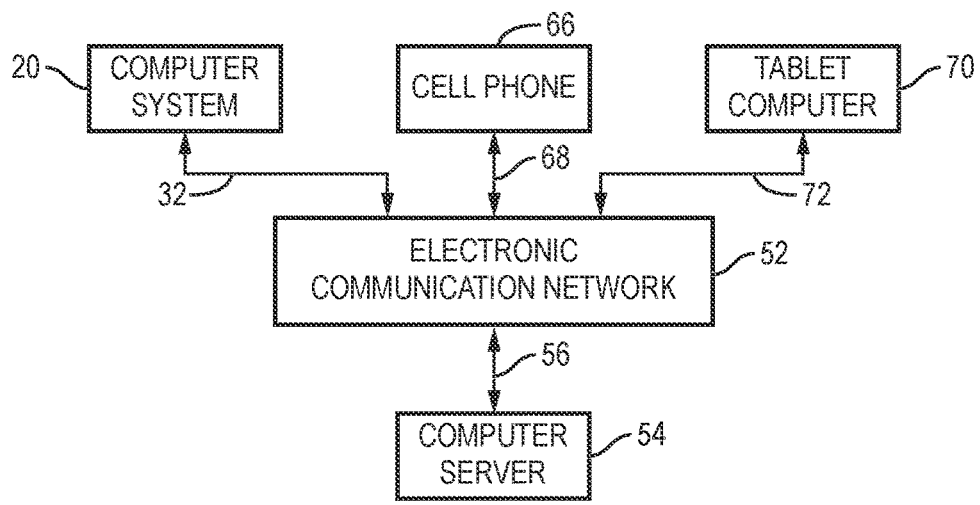
FIG. 3 illustrates an electronic communication network used by the computer system to communicate with a computer server.

FIG. 3 illustrates an electronic communication network 52 that computer system 20 connects to via communication link 32. Electronic communication network 52 represents any digital network, such as the internet, a private wide-area network (WAN), a corporate network, or a home local area network (LAN). Electronic communication network 52 includes a plurality of network cables, switches, routers, modems, and other computer systems as necessary to route data traffic between computer system 20 and other computer systems connected to the electronic communication network.

Computer system 20 is located at a home, office, or other location accessible by user 10. Computer system 20 communicates with computer server 54 via electronic communication network 52. Data packets generated by computer system 20 are output through communication link 32. Electronic communication network 52 routes the data packets from the location of computer system 20 to the location of computer server 54. Finally, the packets travel over communication link 56 to computer server 54. Computer server 54 performs any processing necessary on the data, and returns a message to computer system 20 via a data packet transmitted through communication link 56, electronic communication network 52, and communication link 32. Computer server 54 also stores the data received from computer system 20 to a database or other storage in some embodiments.

Cell phone 66 is connected to electronic communication network 52 via communication link 68, and tablet computer 70 is connected to the electronic communication network via communication link 72. Communication links 68 and 72 can be cellular telephone links, such as 3G, LTE, or WiMAX, in some embodiments. Cell phone 66 and tablet computer 70 are portable computer systems that allow user 10 to utilize the public speaking training system from any location with cellular telephone service or Wi-Fi.

Figure 4:
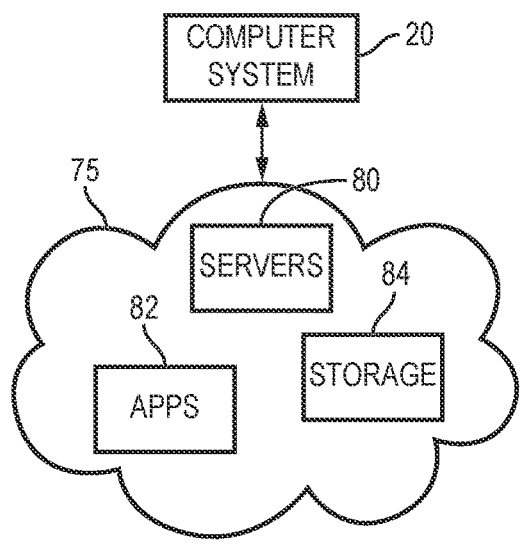
FIG. 4 illustrates a cloud network.

FIG. 4 illustrates cloud network 75. Cloud network 75 represents a system of servers 80, applications 82, and remote storage 84 that computer system 20 connects to and utilizes via communication link 32 and electronic communication network 52. Computer system 20 utilizes functionality provided by servers 80, applications 82 served by or running on servers 80 or other servers, and remote storage 84 located at servers 80 or in other locations. Servers 80, apps 82, and storage 84 are all used by user 10 connecting to a single uniform resource locator (URL), or using a single application on computer system 20, even though apps 82 and storage 84 may exist across a plurality of computer servers 80. Computer system 20 connects to the various computer resources of cloud network 75 transparently to user 10, as necessary to perform the functionality of the public speaking training program.

Cloud 75 is used in some embodiments to serve the program code for the public speaking training program to computer system 20 for use by user 10 to practice a presentation. The training program exists as an application 82 in cloud 75 rather than on a mass storage device 24 local to computer system 20. User 10 visits a website for the training program by entering a URL into a web browser running on computer system 20. Computer system 20 sends a message requesting the program code for the training software from a server 80. Server 80 sends the application 82 corresponding to the presentation training software back to computer system 20 via electronic communication network 52 and communication link 32. Computer system 20 executes the program code and displays visual elements of the application in the web browser being used by user 10.

In some embodiments, the program code for the public speaking training application is executed on server 80. Server 80 executes the application 82 requested by user 10, and simply transmits any visual output to computer system 20. Computer system 20 streams the physical input data representing a presentation by user 10, and any other data required for the training program, to servers 80 via network 52. Servers 80 stream back a simulated environment and feedback to computer system 20.

Besides serving the presentation training program as an application 82, cloud 75 is also used to analyze the physical input data representing a presentation by user 10 in some embodiments. As user 10 gives a presentation to computer system 20, the computer system streams collected data to servers 80 for analysis. Servers 80 execute program code that analyzes the text of the presentation, as well as movement, eye contact, and other visual cues from video of the presentation to extract features, calculate metrics, and determine any feedback that should be given to user 10. Cloud 75 can be used to analyze the presentation of user 10 whether the training program exists as an application 82 on cloud 75, or if the program code is installed and executed locally to computer system 20. In other embodiments, the program code running on computer system 20 performs all the analysis of presentation data locally to the computer system without transmitting the presentation data to servers 80 on cloud 75.

A third use of cloud 75 is as remote storage and backup for presentation data captured by the presentation training program. Computer system 20 sends video, audio, and other data captured during a presentation by user 10 to servers 80 which store the data in cloud storage 84 for future use. In some embodiments, video and audio of the entire presentation is stored in storage 84 after the presentation. In other embodiments, only the features, statistics, metrics, and other results calculated by computer system 20 or servers 80 based on the audio and video presentation data is stored in cloud storage 84. The presentation data in storage 84 is used by user 10 at future times to review progress within the training program or to recall presentation tips and feedback provided by the training program.

Presentation data for a plurality of users can be aggregated within storage 84 for review by a manager or supervisor at a company implementing the training program across an entire employee base. Results for multiple users could also be reviewed by a professor at a university monitoring the progress of students. A manager logs into a program connected to cloud 75 to view aggregate presentation data for each employee participating in the presentation training program. The management program can be hosted on cloud 75 as an application 82. The management program accesses the presentation data in storage 84 and presents a dashboard to the manager. The dashboard shows each participating employee and the progress being made. The manager can review employee performance, see which employees are keeping up with lessons, and assess how well employees are progressing important skill sets. In embodiments where user 10 is simply an individual, and not participating in a corporate training program, result data can be stored on mass storage 24, locally to computer system 20, rather than on storage 84 of cloud 75.

The presentation training program can be run totally on computer system 20, or may be run completely on cloud 75 and simply be displayed on computer system 20. Any subset of the above described cloud functionality may be used in any combination in the various embodiments. In one embodiment, the functionality of the training application is implemented completely on cloud 75, while in other embodiments the functionality runs completely on computer system 20. In some embodiments, the functionality is split between cloud 75 and computer system 20 in any combination.

Figure 5:
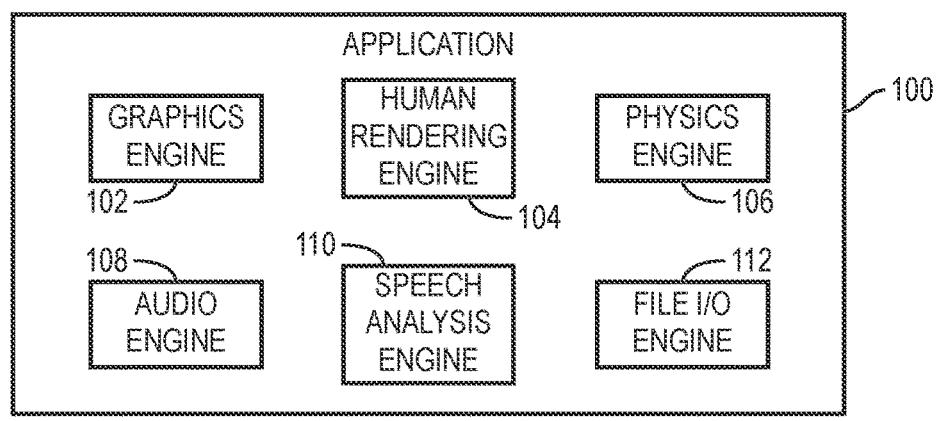
FIG. 5 illustrates a computer application utilizing a plurality of software engines.

FIG. 5 illustrates presentation training application 100 including a plurality of software engines providing the functionality of the application. Application 100 can be stored on mass storage 24 as an installed program, stored in RAM 26 for execution, or stored in cloud 75 for remote access. A software engine can be a library, a software development kit, or other object that denotes a block of software functionality. Software developers can purchase engines predesigned by third parties to provide certain functionality of application 100, and thereby prevent having to completely rewrite the program code for functionality that has already been adequately implemented by others. Engines can also be written from scratch for the unique functionality required to run application 100.

Application 100 includes graphics engine 102, human rendering engine 104, physics engine 106, audio engine 108, speech analysis engine 110, and file input and output (I/O) engine 112. Other engines not illustrated are used in other embodiments to implement other functionality of application 100. In some embodiments, a game engine such as the Unity engine, Torque3D, id Tech, or Unreal Engine is used. Game engines provide a graphics engine, physics engine, audio engine, networking engine, and other functionality common to most 3-D video games in a single package.

Graphics engine 102 provides functionality to generate, render, and display 3-D graphics. 3-D models for tables, chairs, and other environmental objects, as well as the people in the crowd, are all loaded into graphics engine 102 by the program code of application 100. Application 100 communicates to graphics engine 102 the shape and location of each 3-D object to be rendered, and the graphics engine interfaces with graphics hardware of computer system 20 to render and display a 2-D image of the created scene. Animations are implemented by application 100 telling graphics engine 102 which 3-D objects to move, and how to move the objects. Graphics engine 102 helps the creators of application 100 because interfacing with graphics hardware to generate and display a 2-D image from 3-D models is a challenging problem that has been solved by many talented programmers before. There is no reason for a new graphics engine 102 to be created for presentation training application 100, so a third party graphics engine is purchased and integrated into the presentation training application in most embodiments.

Human rendering engine 104 is used to generate and animate 3-D models of human beings. Instead of having to create new 3-D models of human beings, and program the models to animate properly, human rendering engine 104 is integrated into application 100 to provide 3-D models for the crowd. A 3-D model of a person is generated by application 100 simply by making an application programming interface (API) call to human rendering engine including arguments defining characteristics of the desired humans to draw. Human rendering engine 104 can create people of differing heights, weights, skin color, hair color, clothing, etc., by simply varying the arguments to the engine API call. Human rendering engine 104 interfaces with graphics engine 102 to automatically render and display generated 3-D models of human beings. A programmer creating application 100 may not have the expertise to generate realistic 3-D models of human beings and so purchases a third party engine to render human models in some embodiments.

Application 100 uses human rendering engine 104 to generate a simulated audience corresponding to the size of the environment being simulated. For example, if an auditorium is selected for giving the presentation, application 100 uses human rendering engine 104 to generate a few hundred audience members to fill the auditorium. If user 10 selects a board room for the presentation, 5-10 audience members might be generated. In some embodiments, audience members are customized based on a selection by user 10 of the type of audience. Upper management may be rendered to be older and wearing suits, while students will be rendered as younger and having casual clothes. In some embodiments, audience members are rendered with photo-realistic faces based on imported pictures of actual people who user 10 will be speaking to, e.g., important executives at a company the user works at.

Physics engine 106 controls how rendered objects interact with each other. Physics engine 106 approximates gravity so that loose objects in the environment fall toward the ground. Physics engine 106 also causes objects to bounce off of each other with realistic physics reactions.

Audio engine 108 interfaces with the sound hardware of computer system 20. Audio engine 108 allows application 100 to capture audio from a microphone connected to computer system 20 and play audio through speakers connected to computer system 20 without the programmer of application 100 having to understand each underlying operating system or hardware call.

Speech analysis engine 110 receives the audio, video, biometric, and other data captured during a presentation by user 10, extracts features of the presentation from the data, and generates metrics, statistics, feedback, tips, and other output to help the user develop and improve presentation skills. Speech analysis engine 110 is critical new functionality of presentation training application 100 and is programmed from scratch. However, in some embodiments, specific functionality required to observe and extract features from a presentation by user 10 is implemented using 3rd party software.

File I/O engine 112 allows application 100 to read and write data from mass storage 24, RAM 26, and storage 84 of cloud 75. File I/O engine 112 allows the programmer creating application 100 to utilize various types of storage, e.g., cloud storage, FTP servers, USB thumb drives, or hard drives, without having to understand each required command for each kind of storage.

Application 100 modularizes functionality into a plurality of software engines to simplify a programmer's task. Engines can be purchased from third parties where the functionality has already been created by others. For functionality new to application 100, engines are created from scratch. Each engine used includes an API that a programmer use to control the functionality of the engine. An API is a plurality of logical functions and data structures that represent the functionality of an engine. The API of graphics engine 102 may include a function to draw a 3-D model on the screen, with a data structure representing the 3-D model as an input to the API function. Graphics engine 102 also includes functions to move a 3-D object, move the viewpoint the scene is rendered from, or remove a 3-D object from the screen. Audio engine 108 includes an API function call to play a sound file through speakers of computer system 20, or to read any cached audio information from the microphone.

Figure 6:
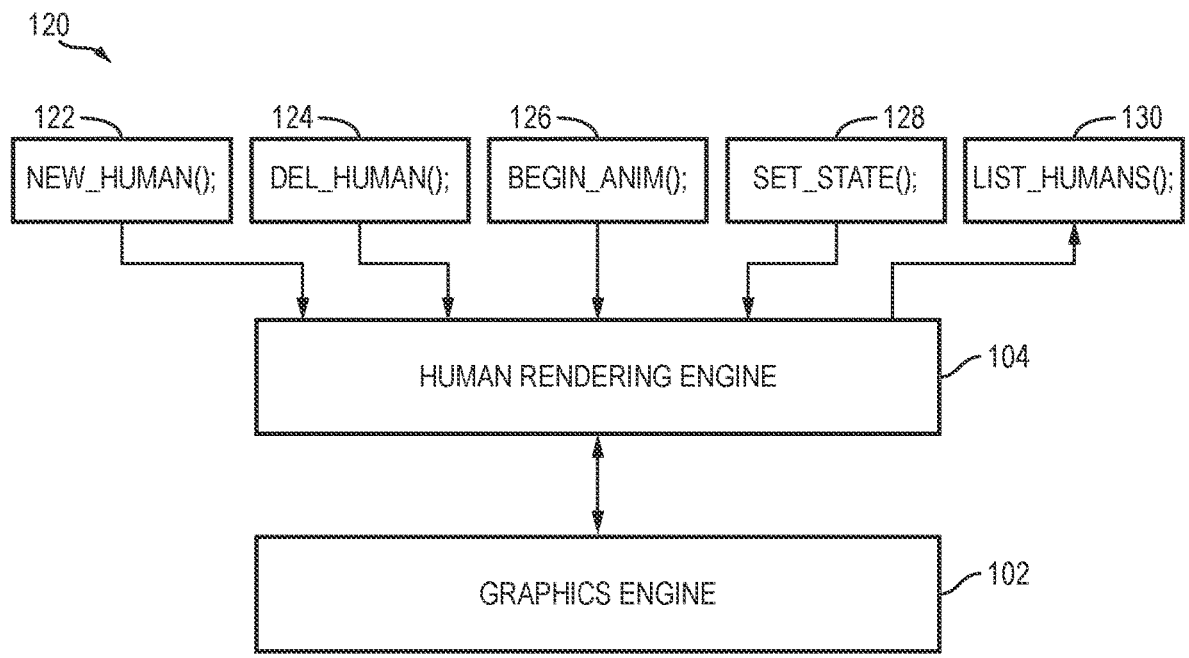
FIG. 6 illustrates a software application programming interface (API)

FIG. 6 illustrates a sample API 120 for human rendering engine 104. API 120 includes new human function 122, delete human function 124, begin animation 126, set state function 128, and list humans 130. Calls to functions 122-130 are integrated into the program code of application 100 to render and animate a crowd on display 34.

A call to new human function 122 creates a new person and draws the person on display 34. Any number of arguments to function 122 control what the person looks like, the clothes the person is wearing, and where the person is located on the screen. The location of a new person can be specified based on another object, e.g., by identifying a chair object the person should sit in, or the location may be specified by a 3-D Cartesian coordinate indicating the location of the person in 3-D space. New human function 122 can be called once for each person desired to be drawn in a crowd, or a single call can be made with arguments defining each person to be drawn in the single call. Delete human function 124 removes an already rendered human from the 3-D environment. An argument to delete function 124 identifies which person in the crowd should be deleted.

Begin animation function 126 causes a rendered human to execute an animation. Arguments to begin animation function 126 indicate which person should do an animation, and define an animation that the rendered person should perform. Human rendering engine 104 includes predefined animations that a programmer can easily make a person perform without having to know a lot about 3-D animation. Human rendering engine 104 includes built-in animations for motions such as head nodding, hand waving, talking, sitting down, and standing up. Other animations can be generated using 3-D modeling software included with human rendering engine 104. A data structure defining the animation is stored along with the program code of application 100, and given as an argument to begin animation function 126 to execute the animation. In presentation training application 100, the animations executed are contingent in large part on the real-time performance of user 10 while using the training program.

Set state function 128 allows application 100 to set an emotional state of a rendered human being, and human rendering engine 104 automatically animates the person in a manner consistent with the emotional state. A person's emotional state could be set to agitated, in which case the person would be animated as fidgety and nervous. Insofar as presentation training application 100, the crowd could be set to a state of engaged, neutral, or bored. Human rendering engine 104 automatically makes the crowd models perform animations consistent with those states. For instance, an engaged crowd member is rendered to lean forward, nod, and make direct eye contact in response to statements by user 10. A bored crowd member may check the time, fall asleep, talk to a neighbor, or rest her head on her arm.

List humans function 130 returns a list of each human rendered by human rendering engine 104. The returned list can be used by other portions of application 100 that need to reference a specific crowd member. List humans function 130 is also used to perform a function on each rendered human at once, such as setting the state of an entire crowd to bored.

Human rendering engine 104 generates 3-D models of people as directed by application 100, and interfaces with graphics engine 102 to draw the humans on a screen and animate the humans. Each engine 102-112 includes an API similar to API 120 used by a programmer to integrate the functionality of the engine into application 100.

Figure 7:
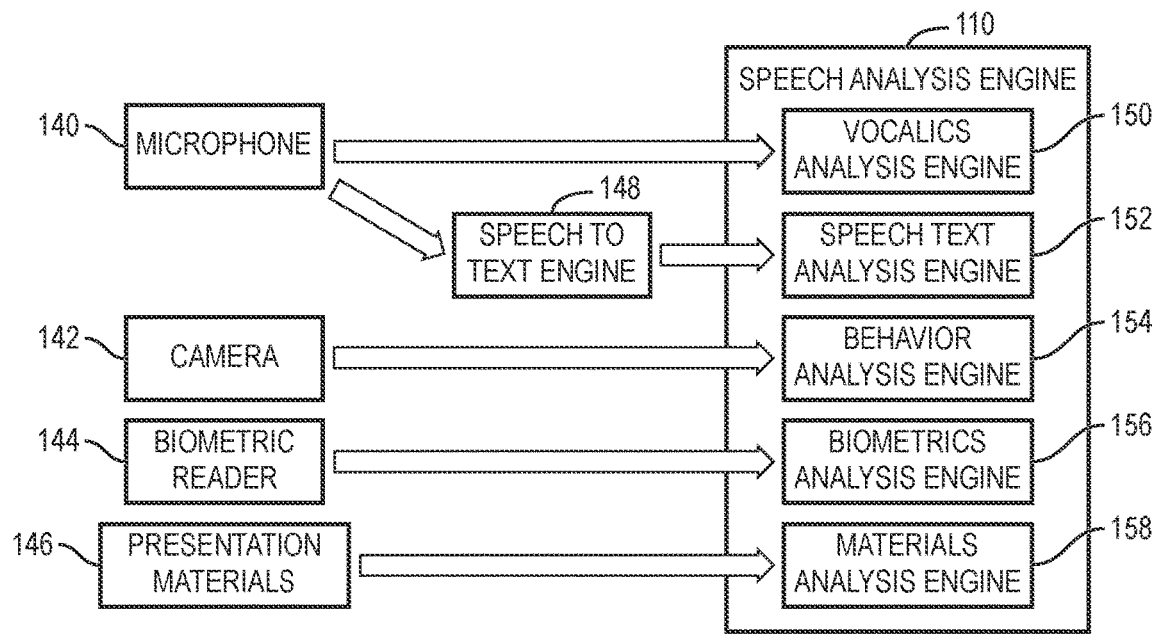
FIG. 7 illustrates physical and other presentation inputs to a speech analysis engine.

FIG. 7 illustrates speech analysis engine 110. Speech analysis engine 110 receives signals from the various input peripherals 28 of computer system 20 and analyzes the inputs to extract features of the presentation and generate metrics used by application 100 to observe and critique a presentation given by user 10. The inputs to speech analysis engine 110 include microphone 140, camera 142, biometric reader 144, and presentation materials 146. The audio from microphone 140 is routed through speech to text engine 148 to generate text of the words that user 10 is speaking. The text from speech to text engine 148 is routed as an additional input to speech analysis engine 110. Speech analysis engine 110 includes a vocalics analysis engine 150, a text analysis engine 152, a behavior analysis engine 154, a biometric analysis engine 156, and a materials analysis engine 158.

Microphone 140 is electrically connected to a line-in or microphone audio jack of computer system 20. Microphone 140 converts analog audio signals in the environment, e.g., speech from user 10, to an analog electrical signal representative of the sounds. Audio hardware of computer system 20 converts the analog electrical signal to a series of digital values which are then fed into vocalics analysis engine 150 of speech analysis engine 110. In other embodiments, microphone 140 generates a digital signal that is input to computer system 20 via a Universal Serial Bus (USB) or other port.

In one embodiment, microphone 140 is a part of a headset worn by user 10. The headset includes both headphones for audio output by computer system 20 to user 10, and microphone 140 attached to the headphones. The headset allows for noise cancellation by computer system 20, and improves the audio quality for the presentation received by speech to text engine 148 and vocalics analysis engine 150.

Vocalics analysis engine 150 analyzes the sound generated by user 10, rather than the content of the words being spoken. By analyzing the sound from user 10, vocalics engine 150 identifies the pace at which the user is speaking, how the pitch, volume, and pace of the user's voice is changing, and the timing and length of pauses inserted by the user. Vocalics analysis engine 150 analyzes the rhythm, intonation, and intensity of the user's voice during a presentation. Vocalics analysis engine 150 provides an engagement score based on the amount of variability in select features of the voice of user 10. In one embodiment, the engagement score provided by vocalics analysis engine 150 is based on the pitch, pace, and volume with which user 10 speaks.

Speech-to-text engine 148 converts the audio signal of the voice of user 10 into text representative of the words being spoken by the user. The text from speech to text engine 148 is provided as an input to speech text analysis engine 152. Text analysis engine 152 analyzes the content of the presentation by user 10. Text analysis engine 152 performs natural language processing and determines linguistic complexity of the speech, analyzes word choice, and marks the use of verbal distractors.

Verbal distractors are sounds or words such as "uhhh," "ummm," "basically," and "like" which a speaker commonly uses to fill gaps of silence or while trying to remember what to say next. Linguistic complexity is an overall rating of the vocabulary being employed by user 10. Text analysis engine 152 rates the linguistic complexity by education level. For example, user 10 may be rated as using words at a middle school level, a university level, or at a professional level. Complexity is determined by performing syntactic analysis utilizing language models.

Word choice analysis looks more specifically at the individual words and phrases used by user 10. Text analysis engine 152 flags a word that appears to be used incorrectly by user 10, and also flags weak language when another more effective word or phrase could be used. If user 10 overuses a specific word or phrase, text analysis engine 152 may flag uses of the phrase to encourage the user to mix in a larger variety of language. If user 10 knows she has a specific problem with certain words or phrases she doesn't want to say, the user can configure application 100 so that speech text analysis engine 152 flags uses of the undesirable words. Flagged words and phrases are features output by text analysis engine 152.

Speech text analysis engine 152 is programmed with specific words and phrases commonly used in specific domains of speech, e.g., in the tech sector or among financial institutions. Speech text analysis engine 152 generates a metric identifying how well user 10 is utilizing the language of a specific domain where the user will be speaking, and suggests word replacements to use language more fitting for the domain. Text analysis engine 152 uses linguistic analysis to generate metrics for clarity and conciseness of speech, sentence structure, sentence length, grammar, audience relatability, professionalism, and competency. Speech text analysis engine 152 extracts other features from the speech text as user 10 presents. Speech text analysis engine 152 identifies a feature when user 10 begins a sentence, ends a sentence, begins a narrative, ends a narrative, etc.

Advanced analysis of the structure of a presentation is performed by text analysis engine 152. Text analysis engine 152 analyzes the beginning and ending of a speech to create a metric rating whether user 10 properly opened and closed the speech, whether the main idea of the speech has been clearly communicated, and whether the body of the speech is structured in a coherent manner. The text of the speech is analyzed to identify metaphors and contrasting language, and generate a metric of proper metaphor use. Metaphors are also output as features. Storytelling or anecdotal elements in the text of the presentation are identified and output as features. A metric to gauge the amount and effectiveness of storytelling and anecdotes being used is also generated.

Text analysis engine 152 is able to identify emotional versus analytical content of the presentation and generates a metric of the proportion of analytical and emotional content. A discourse clarity metric is generated that incorporates computational discourse analysis based on rhetorical structure theory and coherence models. The discourse clarity metric models the flow of concepts discussed in the presentation to identify whether an audience member is likely to be able to follow the ideas and logic of the presentation, and whether the sentences have a syntactic structure that is too complex for the intended audience of the presentation.

Features and metrics output from vocalics analysis engine 150 are combined with results from speech text analysis engine 152 to generate a perception metric. The perception metric rates or identifies how user 10 is being perceived by a crowd. User 10 may be perceived by the crowd as enthusiastic, confident, charismatic, emotional, convincing, positive, competent, etc. The perception metric may include a numerical rating for each possible perception category, e.g., a separate numerical indicator of how enthusiastic, how confident, how emotional, how charismatic, and how convincing user 10 is in her presentation.

Behavior analysis engine 154 receives a video stream of user 10 performing a presentation. The video feed is received by application 100 from camera 142 and routed to behavior analysis engine 154. Behavior analysis engine 154 looks at the behavior of user 10 while presenting the speech. Body movement, posture, gestures, facial expression, and eye contact are all analyzed. Behavior analysis engine 154 looks at body movement, gestures, and posture of user 10 to flag or output a feature if the user is fidgeting her hands, rocking back and forth, or exhibiting other undesirable body movements while presenting. Behavior analysis engine 154 observes the body of user 10 to ensure that the user is properly facing toward the audience. The body movement of user 10 is also analyzed for proper use of hand gestures that match or complement the text of the speech by tying together the outputs of speech text analysis engine 152 and behavior analysis engine 154. Features are output by speech analysis engine 110 corresponding to hand gestures by user 10. Body movement of user 10 is analyzed to ensure adequate movement and gestures. Behavior analysis engine 154 generates a feature for body movement, and flags if the user is too rigid in her appearance or mechanical in her movements. In one embodiment, a third party software application, e.g., Visage, or a hardware device, e.g., Tobii, is used to implement eye tracking. Third party software is also used to track body movement in some embodiments.

Other peripheral devices may supplement the information received from camera 142. In one embodiment, user 10 wears wrist-bands or another peripheral that monitors the position of the user's hands relative to her body and reports hand movements to behavior analysis engine 154. Other motion capture methods are used in other embodiments. In some embodiments, two cameras 142 are used. Parallax between the two cameras 142 helps give behavior analysis engine a depth of view and better gauge the distance of each body part of user 10 from the cameras.

The facial expression of user 10 is monitored to generate a feature when the user does not maintain a desirable facial expression. User 10 should maintain a happy and positive facial expression in most situations, but other facial expressions may be desirable when discussing a negative opinion or relating a harrowing anecdote. Behavior analysis engine 154 also helps monitor for nervous tics or other behavioral anomalies of user 10, such as randomly sticking out the tongue for no reason or blinking in an unsightly manner, by outputting those presentation features to application 100.

Eye contact is monitored to ensure that user 10 sufficiently maintains the important connection with the audience that eye contact provides. The video of user 10 presenting is captured by camera 142, and behavior analysis engine 154 analyzes the image to determine where the user is looking. Behavior analysis engine 154 determines how well user 10 is maintaining eye contact with the crowd, and how well the user is moving eye contact across different areas of the crowd. The direction or location that user 10 is looking is output and stored as a presentation feature.

Behavior analysis engine 154 creates a log of a presentation, identifying when user 10 is looking at the crowd, and when the user is looking elsewhere. Behavior analysis engine 154 outputs a feature when the eye contact state of user 10 changes, e.g., from looking down at notes to looking at the crowd. Eye contact features of user 10 are compared against pre-specified metric thresholds to generate an overall eye contact score. Statistics are available which identify what percentage of the time the user is looking at the crowd. The eye contact score takes into consideration if user 10 looked at each person or section of the room for approximately the same amount of time. If user 10 exhibits a particular problem, such as staring down at her feet for long periods of time, presentation training application 100 uses the information from behavior analysis engine 154 to identify the problem and provide tips and offer video lessons to the user to address the problem.

In one embodiment, user 10 uploads presentation materials 146, such as text of a speech, presentation slides, or notecards to be used for reference during the presentation. User 10 toggles between viewing the presentation materials and viewing the virtual audience. The amount of time user 10 spends looking at presentation materials is considered by application 100 to be time not in eye contact with the audience, while the user is considered to have proper eye contact when the virtual audience is shown instead of the presentation materials.

In some embodiments, a separate camera 142 is used zoomed in to capture a high quality image of the face of user 10. In embodiments with a separate camera 142 for facial recognition, a first camera 142 is zoomed back to capture the entire body of user 10 and observe general body movement while a second camera 142 is zoomed in on the face of user 10 to capture higher quality images for better facial recognition and eye contact analysis. Object tracking can be used to keep the second camera trained on the face of user 10 if the user moves around while presenting. In other embodiments, two cameras are zoomed out to capture user 10 as a whole, in order to get a field of depth, and a third camera is trained on the face of the user.

Biometric reader 144 reads biometrics of user 10 and transmits a data feed representing the biometrics to biometrics analysis engine 156. Biometrics analyzed by biometrics analysis engine 156 include blood pressure, heart rate, sweat volume, temperature, breathing rate, etc. Biometric devices 144 are disposed on the body of user 10 to directly detect biometrics, or are disposed at a distance and remotely detect biometrics. In one embodiment, biometric reader 144 is an activity tracker that user 10 wears as a bracelet, watch, necklace, or piece of clothing, that connects to computer system 20 via Bluetooth or Wi-Fi. The activity tracker detects heartbeat and other biometrics of user 10 and transmits the data to computer system 20. In some embodiments, biometric reader 144 provides information as to movements of user 10 which are routed to behavior analysis engine 154 to help the behavior analysis engine analyze body movements of the user.

User 10 inputs her presentation materials 146, such as overhead slides or handouts, to application 100 for analysis. Materials analysis engine 158 looks at the materials 146 to provide metrics related to how well user 10 is using slides. Metrics include a rating for the number of points on each slide, the amount of time spent on each point, slide design, usage of text versus images, and the type and organization of content. Presentation features extracted from presentation materials 146 include when user 10 advances to the next slide, or when a new bullet point on the same slide is reached.

Each analysis engine 150-158 of speech analysis engine 110 outputs features as user 10 performs a presentation. When a presentation feature is detected, such as a pause in speaking, usage of a certain word, or a break in eye contact, a result signal is generated by a respective analysis engine 150-158. Application 100 captures the features and performs further analysis to determine overall scores and ratings of the performance, generate tips and suggestions, and provide real-time feedback. Application 100 captures the results and outputs of analysis engines 150-158, and analyzes the results based on predetermined metrics and thresholds.

Figures 8, 9:
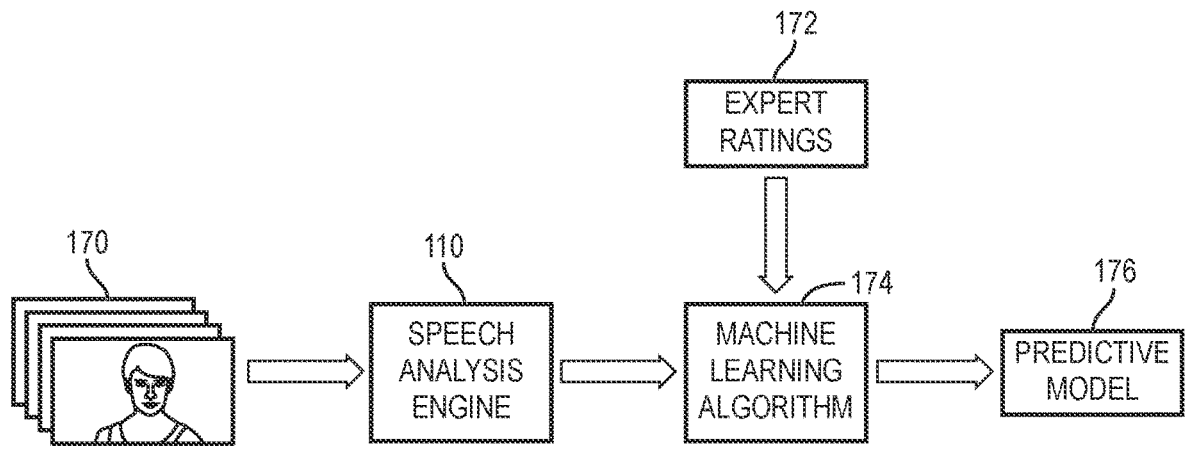
FIG. 8 illustrates a supervised machine learning classification algorithm.
FIG. 9 illustrates initial setup of the public speaking training system.

To interpret the features and metrics from speech analysis engine 110, a supervised machine classification algorithm is used, as illustrated in FIG. 8. Prerecorded speeches 170 are input into speech analysis engine 110 to extract features and generate metrics for each of the prerecorded speeches. The features and metrics from speech analysis engine 110, as well as ratings 172 provided by experts who have observed the speeches 170, are input into machine learning algorithm 174. Machine learning algorithm 174 is used to generate a predictive model 176. Predictive model 176 defines correlations between features and metrics from speech analysis engine 110 and ratings 172 of speeches 170 provided by public speaking experts.

Thousands of speeches 170 are input into speech analysis engine 110 to form the basis of predictive model 176. A wide variety of speeches, both good and bad, are input into the machine learning algorithm. Each speech is input into speech analysis engine 110 to generate the same features and metrics that will be generated when user 10 uses presentation training application 100. In addition, experts are employed to observe speeches 170 and provide ratings 172 based on the experts' individual opinions. In one embodiment, six public speaking experts rate each individual speech 170 to provide the expert ratings 172.

Machine learning algorithm 174 receives the features and metrics from speech analysis engine 110, as well as the expert ratings 172, for each speech 170. Machine learning algorithm 174 compares the key features and metrics of each speech 170 to the ratings 172 for each speech, and outputs predictive model 176. Predictive model 176 includes rating scales for individual metric parameters and features used by application 100 to provide ratings to a presentation subsequently given by user 10. Predictive model 176 defines what features make a great speech great, and what features occur that result in a poor expert rating.

Presentations of user 10 are compared against predictive model 176 to provide tips and feedback. Prior to doing a presentation for analysis by application 100, user 10 performs an initial setup and calibration as shown in FIG. 9. FIG. 9 shows computer window or screen 180 with setup and calibration options 182-190.

Gender option 182 allows user 10 to enter a gender. An accurate gender setting helps speech analysis engine 110 interpret data from microphone 140 and camera 142. Skill level option 184 tells application 100 an approximate starting level for the presentation skills of user 10. Setting skill level option 184 accurately helps application 100 present lessons and topics that are most relevant and helpful to user 10. A beginner will get more remedial lessons. An expert speaker will get advanced lessons, or will be presented with exercises to maintain skills rather than lessons to teach skills.

Options 186-190 take user 10 to other screens where calibration occurs. Calibrate speech recognition option 186 takes user 10 to a screen that walks the user through a calibration process to learn the voice and speaking mannerisms of the user. User 10 is prompted to speak certain words, phrases, and sentences. The calibration process analyzes how user 10 speaks, and uses the data to interpret subsequent presentations using speech-to-text engine 148. Proper calibration helps application 100 generate an accurate textual representation of a presentation by user 10, which improves analysis accuracy of the content of the presentation.

Calibrate eye tracking 188 takes user 10 to a screen where application 100 is calibrated to better recognize where exactly the user is looking. User 10 is asked to move to various locations in the room, and look at directions dictated by application 100. Application 100 analyzes the face of user 10 from various angles and with eyes looking in various directions, and saves a model of the user's face for use in determining where the user is looking during a presentation. In one embodiment, the eye tracking calibration routine displays a dot that moves around display 34 while the eye calibration routine accesses webcam 142 to observe the eye movement and position of user 10 following the dot.

Calibrate facial recognition 190 is used to learn the features of the face of user 10. Photos of the face of user 10 are taken with webcam 142 from various angles, and the user is also prompted to make various facial expressions for analysis. User 10 may also be asked to confirm the exact location of facial features on a picture of her face. For instance, user 10 may be asked to touch the tip of her nose and the corners of her mouth on a touchscreen to confirm the facial recognition analysis. Facial recognition calibration helps speech analysis engine 110 accurately determine the emotions being expressed by user 10 while presenting. In one embodiment, facial recognition of presentation training application 100 is fully automatic, and no calibration is required to track mouth, chin, eyes, and other facial features. In other embodiments, calibration is not required, but may be used for enhanced precision.

In one embodiment, after setup and calibration is completed using page 180, application 100 uploads the configuration data to storage 84 of cloud 75. Uploading configuration data to cloud storage 84 allows user 10 to log into other computer systems and have all the calibration data imported for accurate analysis. User 10 can configure application 100 on a home personal computer, and then practice a presentation in a hotel room using a mobile telephone. The mobile telephone is automatically setup and calibrated to the user's voice and face by downloading configuration data from cloud storage 84. In some embodiments, a portion of the calibration is required to be performed again if a new type of device is used, or when a different size of screen is used.

Figure 10:
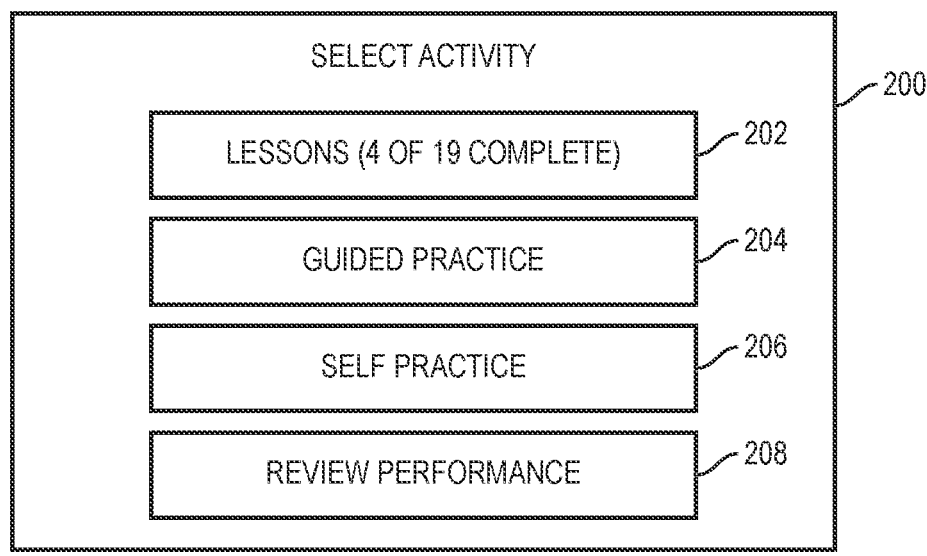
FIG. 10 illustrates an activity selection screen of the public speaking training system.

FIG. 10 shows a screen 200 used by user 10 to begin a presentation training session using application 100. User 10 can do exercises or lessons using option 202, guided practice with option 204, self-practice with option 206, or review the analysis of past performances with option 208.

Lessons button 202 includes a summary of progress that user 10 has completed to date, e.g., so far user 10 has completed 4 of the 19 total lessons. Clicking or touching lessons button 202 takes user 10 to another screen with a more thorough explanation of each available lesson and any progress already completed. Examples of lessons that are available include lessons on enunciation and pronunciation of words, storytelling, improving eye contact, and other best practices for public speaking. Each lesson may include an indication of whether the lesson has been completed, and how well user 10 performed on the lesson.

The lessons of application 100 include instructional videos put together by professional instructors and interactive elements to guide the user through learning specific skills critical to public speaking. After receiving instruction on a skill, and instruction on an activity that the user performs to exercise the skill, the user responds to prompts and performs short bits of speaking to demonstrate an understanding of and ability to perform the skill.

User 10 progresses through the lessons one by one. User 10 may work on a single lesson until the skill is perfected, or may do each lesson once then go back to perfect select lessons. User 10 may decide to only do select lessons that the user knows she needs to work on. Application 100 may suggest after user 10 practices a speech that the user return to specific lessons to remediate certain skills. Progress through lessons is uploaded to cloud storage 84 for review by user 10 on other devices or by a supervisor of the user in a corporate or academic environment.

User 10 does guided practice by clicking or touching button 204. In guided practice, application 100 generates a hypothetical scenario for user 10 to practice a presentation. Application 100 gives user 10 a sample topic to speak on, or gives prompts for the user to answer. User 10 responds to the prompts, or speaks on the given topic for the allowed amount of time, and then application 100 rates the presentation and gives feedback.

Self-practice is performed by clicking or pressing self-practice button 206. Self-practice allows user 10 to practice any speech on any topic that the user needs to present. In one embodiment, after pressing self-practice button 206, user 10 is asked to enter information about the presentation. Entering information such as desired length of presentation, topic of presentation, and technical expertise of crowd, helps application 100 perform analysis tailored to the particular type of presentation user 10 will be giving, and the type of audience user 10 will be speaking in front of. Application 100 can make sure that user 10 uses technical language appropriate for the technical level of the audience, and uses proper technical terms for the field of expertise.

User 10 also configures the room and the crowd to approximate the type of presentation the user will be giving. For instance, if user 10 is speaking before seven board members in a boardroom, application 100 will simulate that environment for the user's presentation practice. If user 10 will be speaking in front of thousands of people in an auditorium, then application 100 renders a large auditorium and fills the auditorium with thousands of rendered humans. Application 100 further simulates different environments by adding audio effects. Application 100 simulates the sound and echo of large auditoriums and stadiums where large arrays of speakers will likely be used. Application 100 likewise simulates the sound of other environments, including adding applause or other crowd noises.

Review performance button 208 allows user 10 to review each past practice performance to see what went right and what went wrong, review tips and feedback, or watch a performance in whole. Both guided practice and self-practice can be reviewed. Lessons are reviewed under lesson button 202, but in some embodiments can also be reviewed under review performance button 208. In addition to analysis and recordings of each past presentation user 10 has completed, application 100 presents summaries of performance trends over time. If user 10 has been steadily improving certain skills while other skills have stayed steady or worsened, the user will be able to see those trends under review performance button 208.

Figure 11:
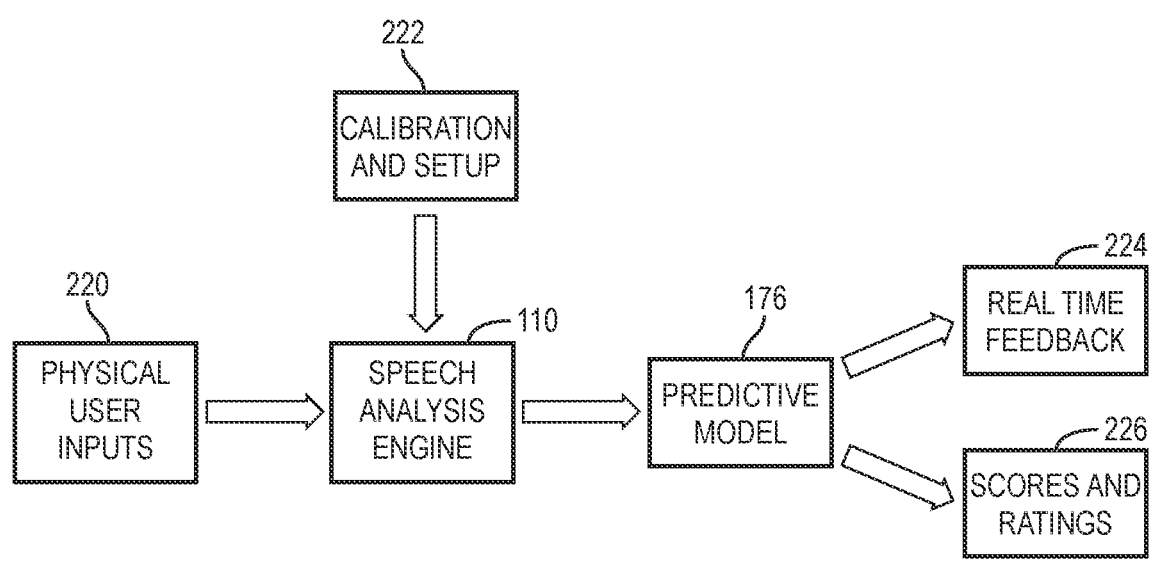
FIG. 11 illustrates a presentation being analyzed to provide real-time feedback and scores and ratings for the presentation.

User 10 selects a presentation mode from screen 200, and then begins doing a practice presentation. FIG. 11 illustrates the process of application 100 analyzing a presentation by user 10. Physical user inputs 220 from input peripherals 28 are provided to speech analysis engine 110. Speech analysis engine 110 interprets physical user inputs 220 with the aid of the calibration and setup 222 that the user previously performed. Speech analysis engine 110 outputs identified features, calculated metrics, and other information that application 100 interprets through predictive model 176 to generate real-time feedback 224 and scores and ratings 226.

Physical user inputs 220 include microphone 140, camera 142, and biometric reader 144. User 10 also provides any presentation materials 146 being used if available. Speech analysis engine 110 receives the physical data generated by user 10 giving a presentation, and analyzes the content of the speech as well as the way the speech is being performed. Calibration 222 helps speech analysis engine 110 analyze physical inputs 220 because the speech analysis engine becomes aware of certain idiosyncrasies in the way user 10 pronounces certain words, or the way the user smiles or expresses other emotions through facial expressions.

Speech analysis engine 110 extracts features and generates metrics in real-time as user 10 performs a presentation. The features and metrics are all recorded for future analysis, but are also routed to predictive model 176 for comparison against various thresholds contained within the predictive model. Based on how the presentation by user 10 compares to the speeches 170 that were expertly rated, application 100 generates real-time feedback during the presentation and scores and ratings for presentation after the presentation is complete.

Real-time feedback comes in the form of the 3-D simulated crowd and environment, as well as alerts and notifications. Application 100 renders a simulated crowd to watch the presentation of user 10. The rendered crowd reacts realistically to the presentation. If user 10 is engaging, the crowd will be rendered as attentive and observant, but if the user is not engaging, the audience is rendered as being bored and nonobservant. Application 100 also provides optional audible and on-screen alerts and status updates. Application 100 may display a graph of certain metrics over time that user 10 wants to keep an eye on during the presentation. An audible ding may be used every time user 10 uses a verbal distractor to train the user not to use distractors. Visible and audible real-time feedback is configurable, and application 100 includes an option to completely disable real-time feedback. User 10 presents uninterrupted and reviews all feedback after the presentation.

Scores and ratings 226 are provided by application 100 when user 10 completes a presentation. Scores and ratings 226 reflect the features and metrics of an entire presentation, and may be based on peaks, averages, or ranges of metric values. Multiple scores are provided which are each based on a different combination of the metrics and features generated by speech analysis engine 110. In one embodiment, one overall score is presented, which combines all of the presentation attributes.

FIGS. 12*a*-12*e* illustrate user 10 giving a simulated presentation using application 100. In the embodiment of FIGS. 12*a*-12*d*, a large flat-screen television is used for the presentation. In the embodiment of FIG. 12*f*, a virtual reality headset is used. In other embodiments, other types of screens, such as projectors, phones, tablets, or computer monitors, are used.

Figure 12A:
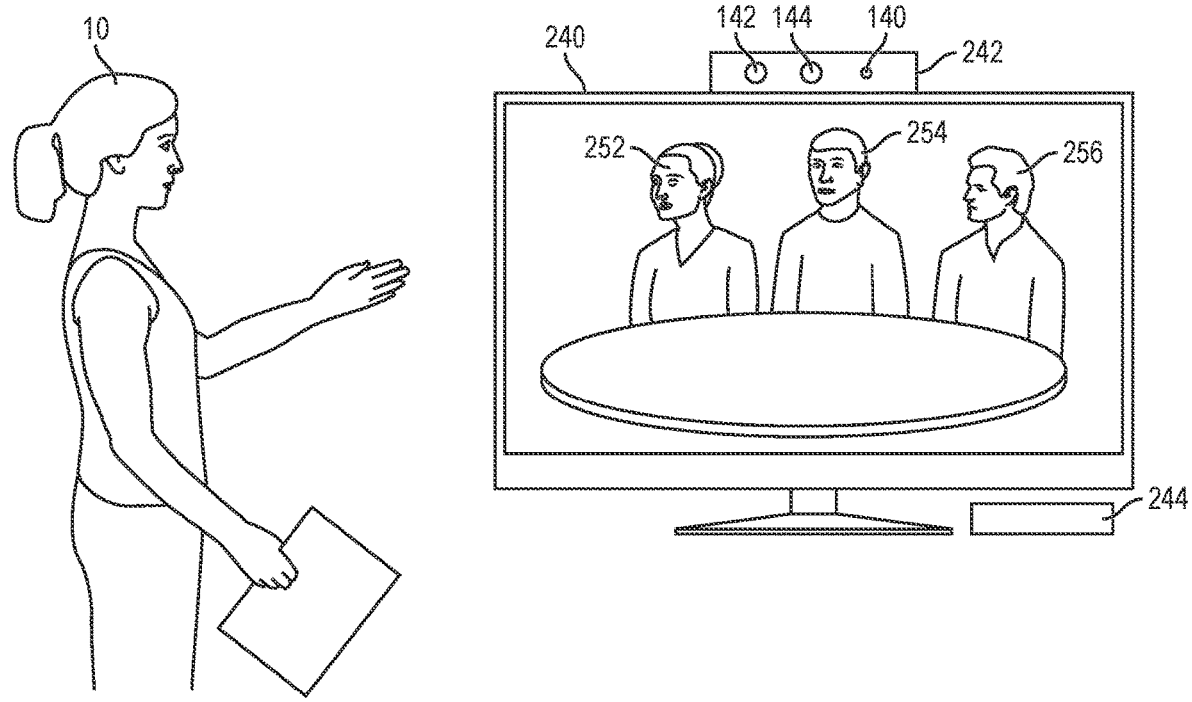
FIGS. 12a-12e illustrate a person practicing a presentation with the public speaking training system.
Figure 12B:
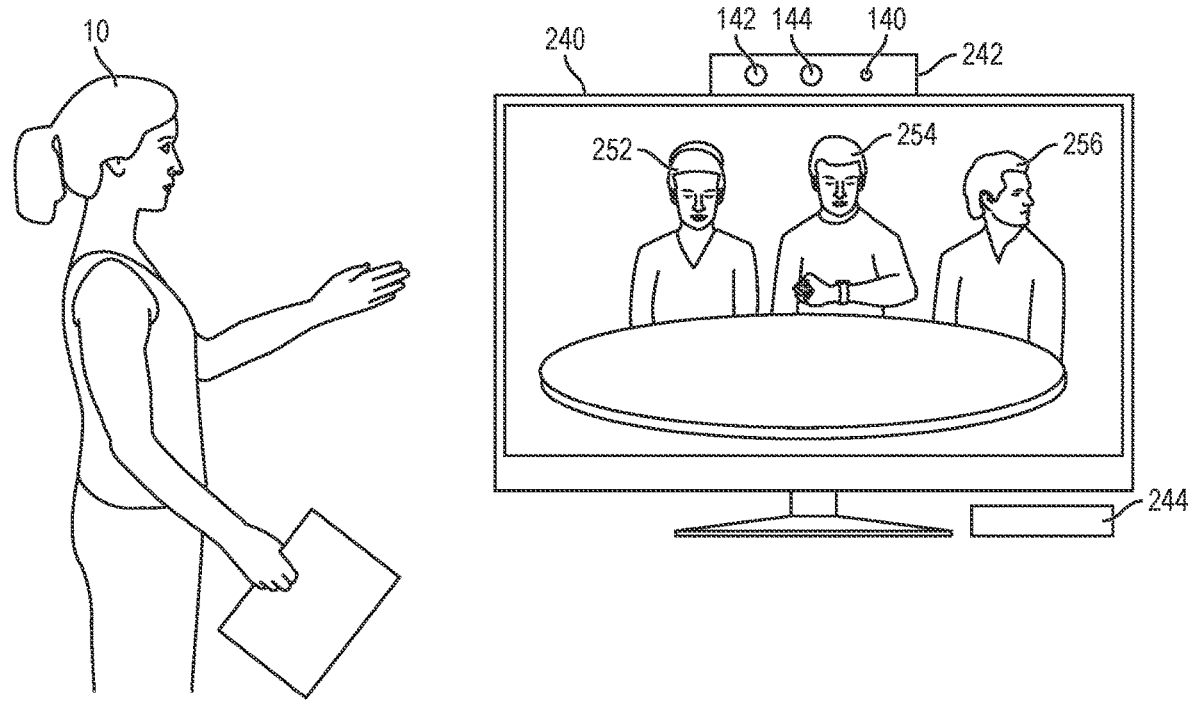

FIG. 12*a* illustrates user 10 giving a simulated presentation in front of television 240. A physical input device or sensor array 242 is mounted over television 240. Sensor array 242 includes microphone 140, camera 142, and biometric reader 144. A computer 244 is set adjacent to television 240 to run application 100. Application 100 renders a virtual audience including audience members 252, 254, and 256 on the screen of television 240. Microphone 140 receives sound waves from user 10 speaking during the presentation and converts the sound waves to an electrical signal. Microphone 140 is connected to computer 244 so that application 100 is able to receive input from the microphone. In some embodiments, an analog signal is generated by microphone 140 and converted to a digital signal by sound hardware of computer 244. In other embodiments, microphone 140 includes a built-in analog-to-digital converter and transmits a digital signal to computer 244.

Camera 142 transmits an image of user 10 to computer 244, so that application 100 can observe movement of the user during a presentation. Biometric sensor 144 is a thermographic camera in the embodiment of FIG. 12*a*. Other types of biometric sensors are used in other embodiments. Thermographic camera 144 is sensitive to infrared radiation and creates a thermal image of user 10. The thermal image is useful to gauge temperature, heartbeat, and breathing patterns of user 10. User 10 gives a presentation in front of television 240 and sensor array 242. Application 100, running on computer 244, generates a simulated environment and a simulated crowd, and then analyzes the presentation.

The simulated audience includes realistic renderings of human beings, and the people in the audience react realistically to the presentation by user 10. If application 100 determines that user 10 is not being engaging, the application renders the audience in a manner indicating boredom. For instance, in FIG. 12*b*, audience member 252 is looking down at her lap, audience member 254 is checking the time, and audience member 256 is staring out of a window at the side of the room. The audience members 252-256 are animated, and perform different actions over time to indicate boredom. An audience member may check the time at one point, then put his or her head down on the table a little bit afterwards. Other actions indicating boredom include looking anxious to leave, talking amongst each other in the crowd, or head scratching.

Figure 12C:
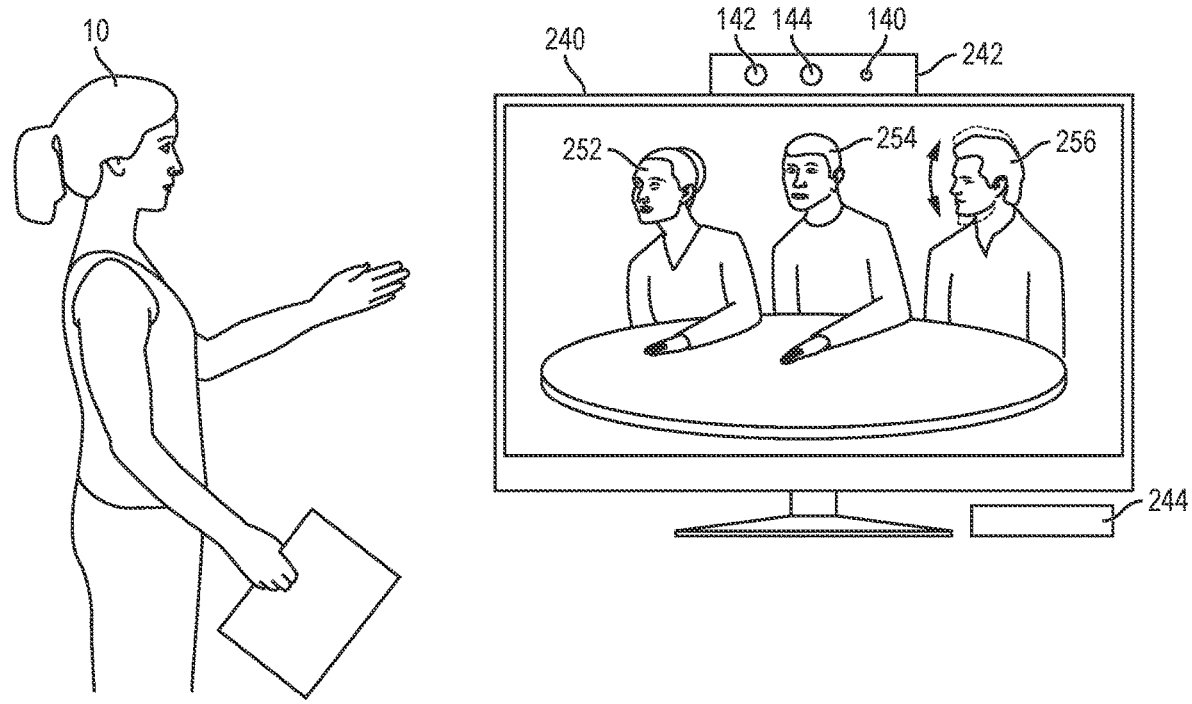

On the other hand, if user 10 is engaging in her presentation, the audience members are rendered as being attentive and interested. In FIG. 12*c*, audience members 252 and 254 are rendered as leaning forward in their seats. Audience member 256 is nodding his head in agreement with a point user 10 is making. Audience members may also laugh at an anecdote, clap at appropriate times, and make good eye contact to indicate interest or engagement. In one embodiment, the audience may be in three different states: engaged, disengaged, or neutral. In other embodiments, more levels of engagement are used.

Figure 12D:
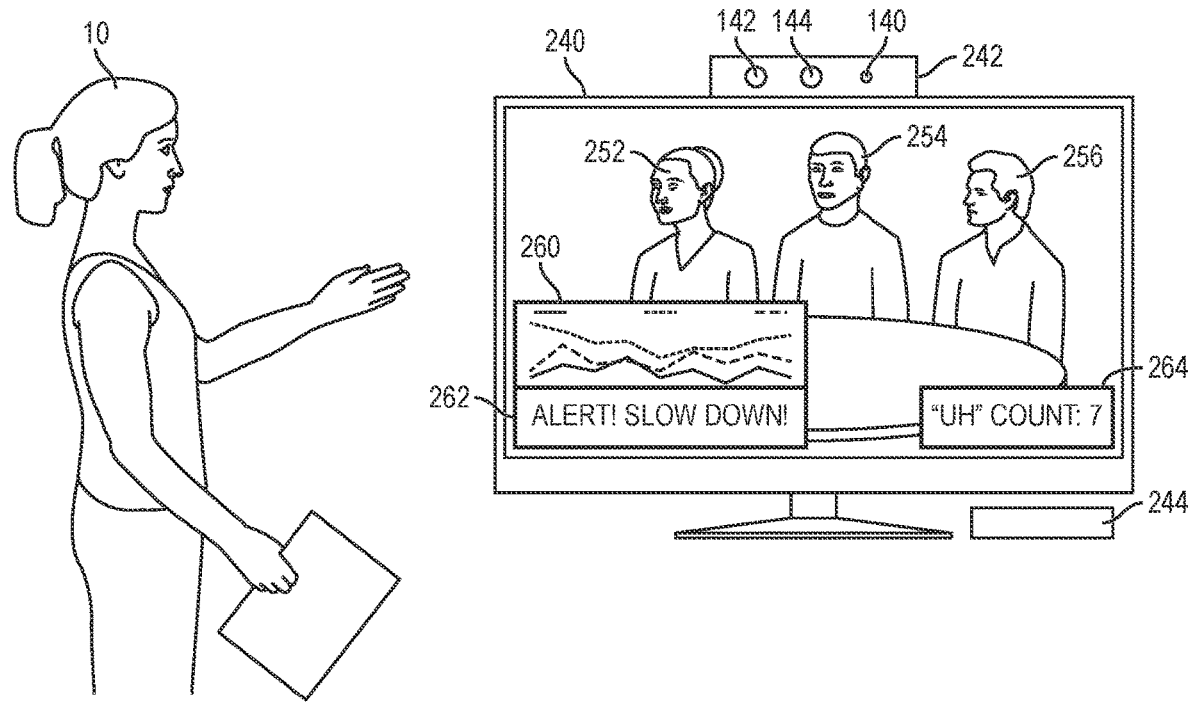

FIG. 12*d* illustrates examples of real-time feedback 224. Application 100 displays a feature or metric graph 260 while user 10 is presenting. User 10 configures metric graph 260 to display metrics that the user is having trouble with, or wants to practice. In other embodiments, application 100 displays any metric or feature that the application determines is of importance to user 10 at a particular moment. The metric or feature graph is rendered to change over time as the presentation by user 10 progresses. Values for the features and metrics are recalculated periodically and graph 260 is updated to show how the values change. The metric graph 260 may grow to the right as time passes, zoom out over time to stay the same size but still show a graph of the entire presentation, or only show the most recent period of time, e.g., the last thirty seconds of the presentation.

Alert or notification 262 indicates when a metric is outside of a threshold goal. In FIG. 12*d*, user 10 is going faster than a goal set by application 100 for the user. Application 100 uses notification 262 to alert user 10 to pay attention to the pace of the presentation and slow down a bit to meet the goal. Other notifications are possible for any reason that application 100 may find use in communicating with user 10 during a presentation. Notifications 262 are used to alert user 10 when time for the presentation is running out, when the user is moving around too much, or when the user needs to smile more.

Counter 264 is used to keep user 10 notified of the number of verbal distractors being used. User 10 may configure application 100 to show the distractor counter because the user knows a problem exists. Application 100 may also automatically show distractor counter 264 if too many distractors are used. Counter 264 may be used to show the total of all distractors used, or one particular distractor that user 10 uses excessively. Other counters are used in other embodiments. In one embodiment, a running total of the number of anecdotes is shown, or a timer showing elapsed or remaining time is displayed.

Figure 12E:
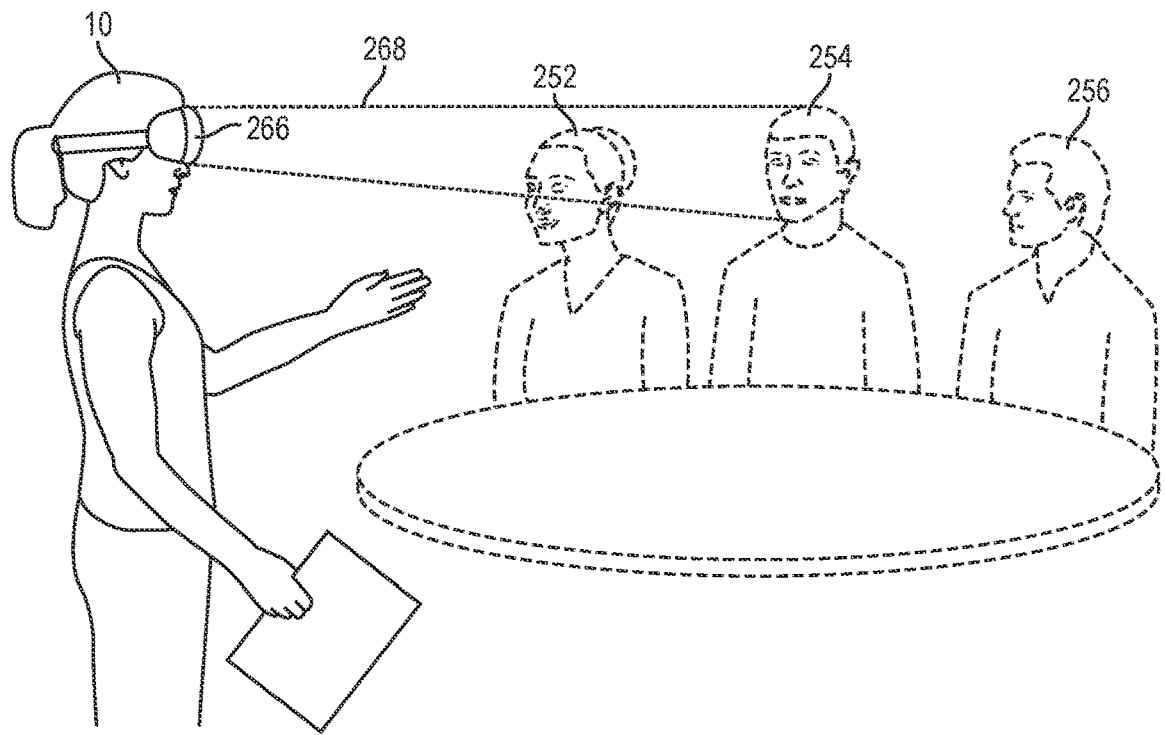

FIG. 12*e* illustrates user 10 using a virtual reality (VR) headset 266 for application 100. Audience members 252-256 are projected in 3-D on small display screens within VR headset 266. The audience is drawn as a dashed line in FIG. 12*e* to indicate that the audience does not exist in real life, but that to user 10 the audience appears at the location indicated. VR headset 266 understands the orientation of the head of user 10 and changes the display so that when the user moves, the audience always appears to be at the same location relative to the room the user is in. If the user 10 looks down, the audience is displayed further up within VR headset 266. If the user 10 looks up, the audience is displayed lower in VR headset 266. Application 100 is able to calculate the direction 268 that user 10 is looking. In FIG. 12*e*, line of sight indicator 268 shows that user 10 is making eye contact with audience member 254.

In some embodiments, sensor array 242 is used along with VR headset 266 to gather additional information about the movement and orientation of the body parts of user 10. VR headset 266 may include cameras trained on the eyes of user 10 to determine where the user is looking with higher accuracy. VR headset 266 may be a mobile device that operates separately from any other computer system and connects to cloud 75 for some functionality. Samsung Gear VR, Oculus Rift, or Google Cardboard devices are used in some embodiments.

In other embodiments, augmented reality devices, such as Microsoft HoloLens, are used instead of virtual reality devices. Augmented reality devices allow user 10 to see the environment around her, but are able to overlay simulated audience members into the real environment. User 10 is able to give a practice presentation in the actual room where a real performance will later be given, and application 100 simulates a realistic audience in the room.

In one embodiment, no display 240 is used while presenting. User 10 wears a headset with headphones and microphone 140 while presenting. Training application 100 receives and analyzes an audio signal of the presentation from microphone 140 without presenting real-time feedback using display 240.

Figure 13:
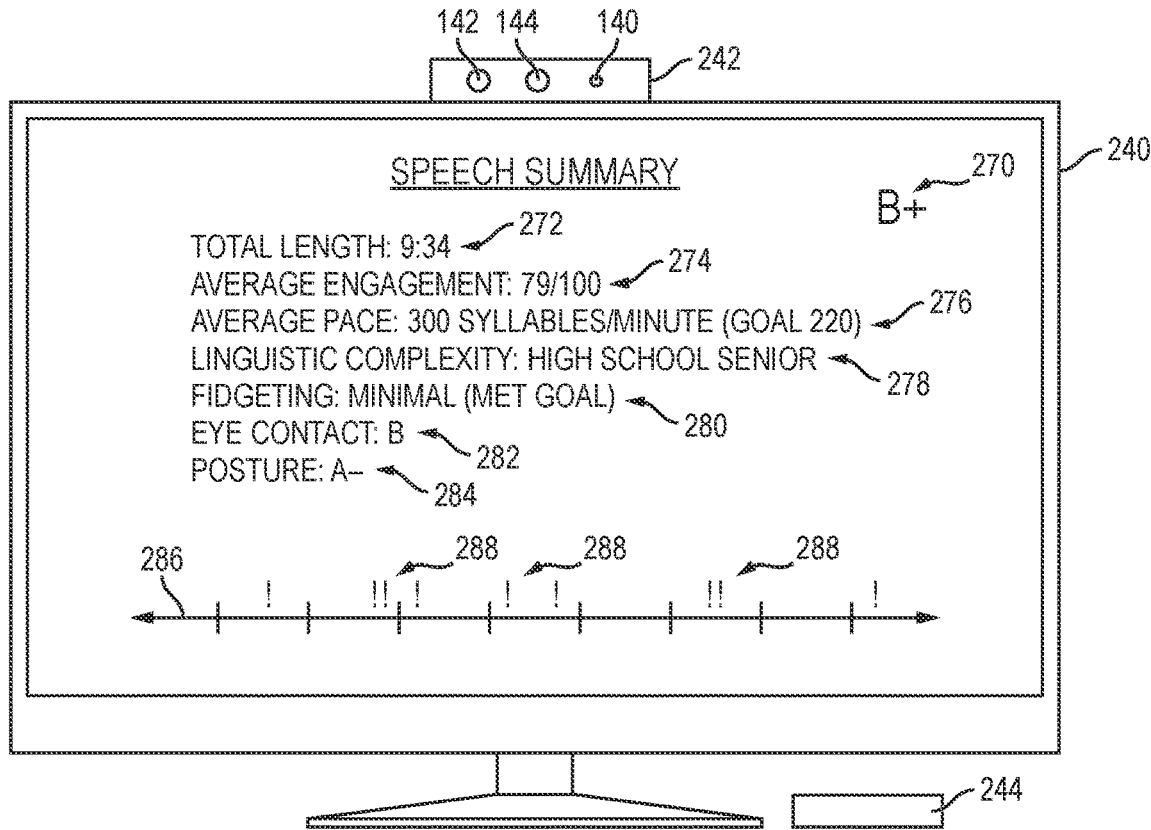
FIG. 13 illustrates a summary screen of the public speaking training system after completion of a presentation.

FIG. 13 illustrates a summary page that is displayed after user 10 completes a presentation. Application 100 gives the presentation an overall score 270 in a letter grade or numerical form, and provides additional metrics, statistics, and scores. Application 100 reports total presentation time 272, and can also notify user 10 how the total time of the presentation compared to a goal set by the user or by the application. Average engagement 274 is presented as a total out of 100, but may also be a letter grade or other score. Average pace 276 is displayed, and is compared to a goal that user 10 is trying to meet. The level of linguistic complexity used is displayed at 278. The level of fidgeting during the presentation is displayed at 280, because user 10 has displayed excessive fidgeting in the past. In the presentation just completed in FIG. 13, user 10 has met the goal of reducing fidgeting to a minimum. Eye contact has been graded a B by application 100, and is displayed at 282. The posture of user 10 has been graded an A−, and is displayed at 284.

Application 100 shows user 10 a timeline 286 of the presentation. Timeline 286 represents the entire presentation from beginning to end, and includes periodic vertical time markers to help orient user 10. Points of interest 288 are displayed on the timeline as exclamation points, stars, or other symbols, and show the user where good or bad events happened during the presentation. In one embodiment, a first symbol is used to mark where the user performed especially well, and a different symbol is used to mark where the user did something that needs correction.

User 10 clicks or touches one of the points of interest 288 to pull up a screen with additional information. A popup tells user 10 what went right or what went wrong at that point of the presentation. The popup also links to any lessons or tutorials that might be helpful in correcting a problem. A video window allows user 10 to view his presentation beginning right before the point where something of interest occurred. User 10 clicks through all of the points of interest 288 to see each aspect of the presentation that application 100 determined needs attention, and continues taking lessons or practicing to get better at public speaking.

Figure 14:
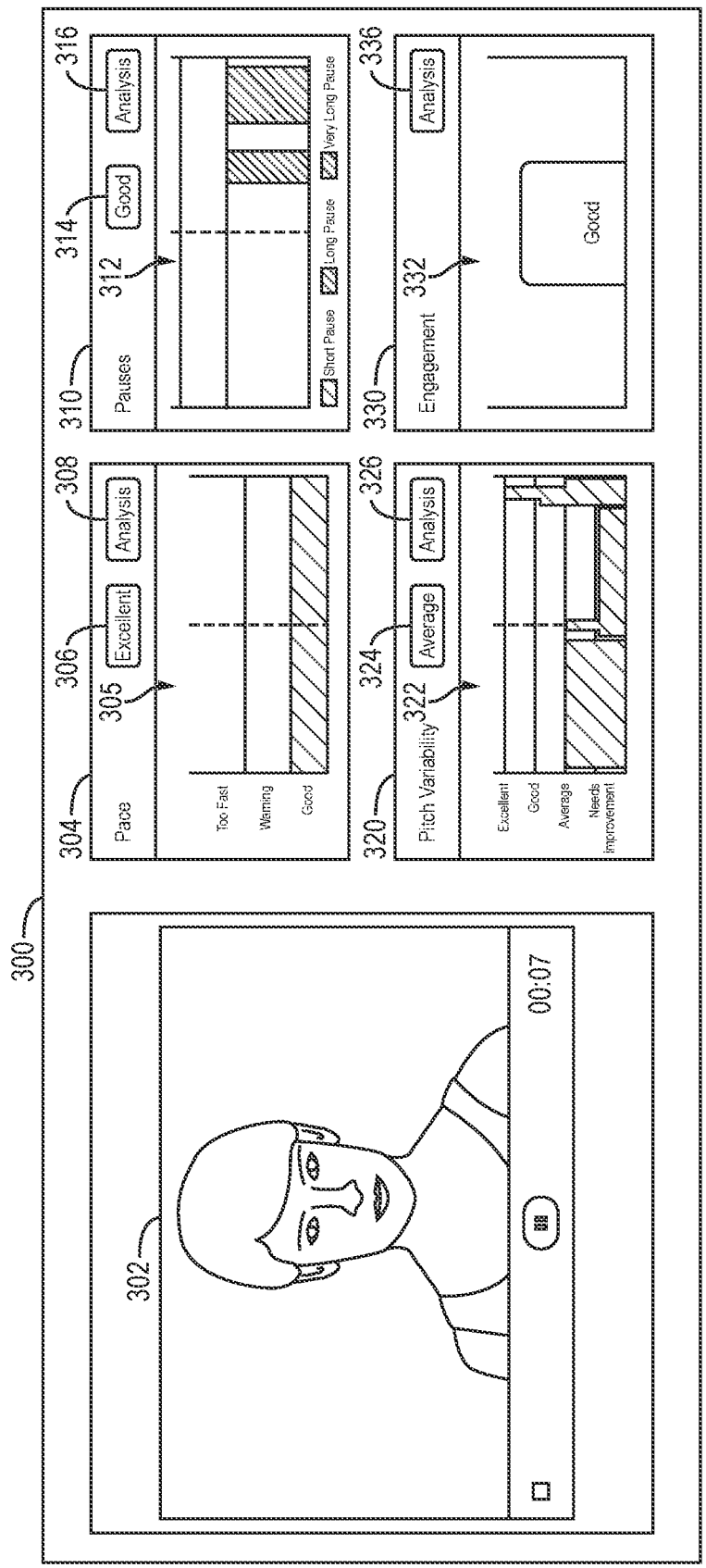
FIG. 14 illustrates a user replaying a performance to review noteworthy aspects.

FIG. 14 illustrates a screen 300 for user 10 to review a video 302 of a public speaking performance. Screen 300 is accessed by clicking timeline 286 or a point of interest 288. Clicking timeline 286 plays the presentation in its entirety while clicking a point of interest 288 plays only the pertinent portion of the presentation video.

Pace box 304 presents information regarding the pace with which user 10 spoke over time. Graph 305 shows a pace rating change over time along with video 302. An overall pace rating 306 shows that overall user 10 spoke with an excellent pace. Analysis button 308 is clicked by user 10 to view detailed analysis regarding speaking pace including specific tips and tutorial videos.

Pauses box 310 presents information regarding pauses in speaking taken by user 10 during the presentation. Graph 312 illustrates when pauses occur over time along with video 302. The specific time currently playing in video 302 is illustrated at the dotted line at the center of graph 312. User 10 can see upcoming pauses approaching from the right side of graph 312. Overall pauses rating 314 shows that user 10 did "good" with pauses during the presentation. Analysis button 316 opens a popup or another page explaining how the "good" rating was calculated and showing tips and tutorial videos for improving usage of pauses by user 10.

Pitch variability box 320 presents information regarding the use of pitch by user 10 during the presentation. Graph 322 shows a rating of pitch variability over time and follows along with video 302. Overall pitch variability rating 324 shows that user 10 did "average" for the presentation as a whole. Analysis button 326 opens a popup or another page showing detailed analysis of pitch variability by user 10. Engagement box 330 shows that user 10 did "good" with audience engagement over the presentation as a whole. Graph 332 may highlight when specific events affecting engagement occur in video 302. Analysis button 336 shows a complete analysis of how the "good" rating of engagement was determined.

FIG. 15*a* illustrates screen 340 with a report viewed by a supervisor at a company to monitor performance of employees. Screen 340 could be used in other situations, such as a professor or teacher monitoring the performance of students. Summary 342 shows information regarding the company or university and statistics about the employees or students as a whole. Summary 342 shows the company name, average score of employees, total number of employees, and the total practice time of the employees. Other pertinent information is presented in other embodiments.

A table of users 344 is presented below summary 342. The users 344 are employees, students, or other set of users being monitored by a supervisor, manager, teacher, etc. Location column 346 shows the location of each user 344. Sessions column 348 shows the number of training sessions that each user has participated in. Total time column 350 shows the amount of presentation time that each user has participated in. In some embodiments, the table shows total time or total sessions over all time, and over the last month. Last session column 352 shows the date of the last training session performed by each user. Average score column 354 shows the average score over all session for each user. In other embodiments, the average score column 354 is calculated over a certain number of presentations or over a limited period of time. View details column 356 includes buttons clickable by a manager to view additional information regarding individual users.

Figure 15B:
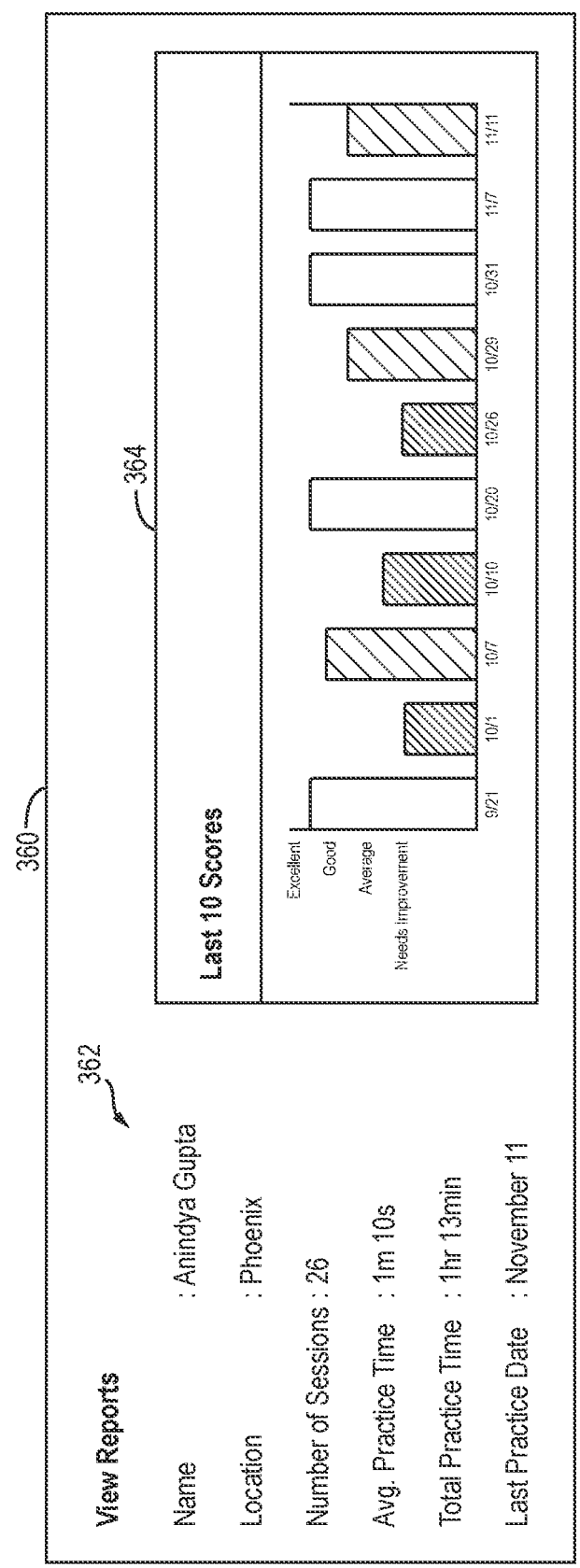

FIG. 15*b* illustrates a screen 360 displayed to a manager after clicking a view details button 356 from screen 340 of FIG. 15*a*. Summary section 362 displays the name and other personal information of the specific user the manager clicked on. Summary section 362 further displays performance information such as total number of sessions, average practice time per session, total practice time across all sessions, and the date of most recent practice session. Other information is presented in other embodiments. Table 364 illustrates a performance rating for the most recent 10 practice sessions of the user. The manager can click a particular session from 364 to get detailed information and review video of the session on a screen similar to screen 300 in FIG. 14. In one embodiment, table 364 is scrollable so that information about all past presentations is viewable.

The presentation training application 100 utilizes a 3-D simulation, speech recognition, vocalic analysis, facial recognition, other non-verbal feature analysis, and video hints to provide individualized dynamic feedback to user 10. A practice presentation by user 10 is compared against hundreds or thousands of sample speeches which have been expertly rated. A rating scale is obtained by rating each of the sample speeches and comparing the ratings to the parameters of the sample speeches, such as pace, pitch variability, volume, volume variability, pauses, types of pauses, complexity of language, verbal distractors, eye contact, facial gestures, body movement, and presentation materials. A 3-D rendered audience is simulated in an environment and reacts in real-time. An overall performance score is assigned when the presentation is complete based on the individual parameters. Application 100 can be used as an on-demand training and practice environment for public speaking and presentation or as a learning object in a communications course. Application 100 includes a series of lessons introducing best practices through short videos, and allowing user 10 to practice individual concepts. Application 100 improves on prior art presentation training programs by providing real-time feedback, expert ratings, and gamification elements to maintain engagement.

User 10 is awarded badges, points, and ranks based on the parameters such as practice time, score, improvement of metrics over time, etc. Users can log into an online dashboard to view their badges and ranks, compare earned badges to other students or employees, and see what benchmarks need to be reached to earn new badges or advance to the next rank. The gamification features improve engagement between user 10 and application 100. User 10 uses application 100 on a continuing basis to improve and maintain public speaking skills.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of speech training, comprising:
providing a predictive model including a plurality of rating scales for a plurality of presentation features, wherein a first rating scale for a first feature of the plurality of presentation features includes a plurality of thresholds for rating the first feature, and wherein the plurality of thresholds is identified by a machine learning algorithm generating the predictive model;
displaying a simulated audience member;
receiving a presentation by a user;
extracting the first feature from the presentation;
analyzing the presentation by comparing the first feature against the plurality of thresholds on the first rating scale of the predictive model; and
generating a reaction of the simulated audience member based on a result of analyzing the presentation.

2. The method of claim 1, wherein the first feature is a measurement of an amount and type of hand gestures of the user detected in the presentation.

3. The method of claim 1, further including displaying a plurality of simulated audience members.

4. The method of claim 3, wherein the number, ethnicity, gender, clothes, skin tone, voice, profession, domain, and technical expertise of simulated audience members is configurable.

5. The method of claim 1, wherein the reaction of the simulated audience member depends on the user's performance in real-time and includes facial expressions and built-in animations for motions or gestures.

6. The method of claim 1, wherein the reaction of the simulated audience member depends on the user's performance in real-time and includes talking, speaking, or asking questions.

7. The method of claim 1, further including providing an online dashboard for a trainer or instructor at an organization to create and configure training assignments or lessons for user practice including presentation topics, interview questions, or other prompts for the user, wherein online dashboard allows the trainer or instructor to review results data for a plurality of users.

8. The method of claim 1, further including providing customization options for an environment of the presentation, wherein the environment can be selected from a plurality of possible customization options including auditorium, video conference, and board room.

9. The method of claim 1, further including recording the presentation using a laptop, personal computer, mobile device, web browser, virtual reality, or augmented reality device.

10. A method of speech training, comprising:
providing a predictive model including,
a first rating scale for a vocalics feature,
a second rating scale for a content feature, and
a third rating scale for a body language feature,
wherein the first rating scale, second rating scale, and third rating scale each includes a plurality of thresholds identified by a machine learning algorithm generating the predictive model;
displaying a simulated audience member;
receiving a presentation by a user;
extracting the vocalics feature, content feature, and body language feature from the presentation;
analyzing the presentation by,
comparing the vocalics feature extracted from the presentation against the plurality of thresholds of the first rating scale,
comparing the content feature extracted from the presentation against the plurality of thresholds of the second rating scale, and
comparing the body language feature extracted from the presentation against the plurality of thresholds of the third rating scale; and
generating a reaction of the simulated audience member based on a result of analyzing the presentation.

11. The method of claim 10, wherein the vocalics feature includes pitch variability, pace variability, volume variability, pauses, intonation, pace, rhythm, intonation, or intensity.

12. The method of claim 10, wherein the vocalics feature includes speech emotion recognition to analyze if the user will be perceived as enthusiastic, confident, charismatic, emotional, convincing, positive, negative, or competent.

13. The method of claim 10, wherein the content feature includes usage of weak language, sentence length, sentence structure, proper usage of domain-specific vocabulary, linguistic complexity, storytelling, clarity, conciseness, structural coherency, use of emotional versus analytical content, audience perception, word choices that match predefined terms expected in the presentation, or presentation slide design.

14. The method of claim 10, wherein the body language feature includes eye contact, hand gestures, body movement, facial expression, or posture.

15. The method of claim 10, further including providing an online dashboard for a trainer or instructor at an organization to review results data for a plurality of users.

16. The method of claim 10, further including recording the presentation using a laptop, personal computer, mobile device, web browser, virtual reality, or augmented reality device.

17. A method of speech training, comprising:
providing a predictive model including a plurality of rating scales for a plurality of presentation features, wherein a first rating scale for a first feature of the plurality of presentation features includes a plurality of thresholds for rating the first feature, and wherein the plurality of thresholds is identified by a machine learning algorithm generating the predictive model;
displaying a simulated audience member;
receiving a presentation by a user;
extracting the first feature from the presentation;
analyzing the presentation by comparing the first feature against the plurality of thresholds on the first rating scale of the predictive model, wherein the first feature is a vocalics feature, a content feature, or a body language feature of the presentation; and
generating a reaction of the simulated audience member based on a result of analyzing the presentation.

18. The method of claim 17, wherein the vocalics feature includes pitch variability, pace variability, volume variability, pauses, pace, rhythm, intonation, or intensity.

19. The method of claim 17, wherein the content feature includes usage of weak language, sentence length, sentence structure, proper usage of domain-specific vocabulary, linguistic complexity, storytelling, clarity, conciseness, structural coherency, use of emotional versus analytical content, audience perception, word choices that match predefined terms expected in the presentation based on a technical domain of the presentation, or presentation slide design.

20. The method of claim 17, wherein the body language feature includes eye contact, hand gestures, posture, body movement, or facial expression.

* * * * *